(12) United States Patent
Yoshida

(10) Patent No.: US 7,617,461 B2
(45) Date of Patent: Nov. 10, 2009

(54) INFORMATION PROCESSING DEVICE, INFORMATION PROCESSING METHOD, PROGRAM, AND STORAGE MEDIUM

(75) Inventor: Mayuko Yoshida, Soraku-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 524 days.

(21) Appl. No.: 11/590,213

(22) Filed: Oct. 30, 2006

(65) Prior Publication Data

US 2007/0109580 A1 May 17, 2007

(30) Foreign Application Priority Data

Nov. 14, 2005 (JP) ............................. 2005-329170

(51) Int. Cl.
*G06F 3/00* (2006.01)
*G06F 3/048* (2006.01)

(52) U.S. Cl. .................. 715/777; 715/706; 715/709; 715/772

(58) Field of Classification Search ................ 715/709, 715/706, 772, 777, 977
See application file for complete search history.

(56) References Cited

U.S. PATENT DOCUMENTS

| | | | | |
|---|---|---|---|---|
| 5,045,880 A | * | 9/1991 | Evanitsky et al. | 399/82 |
| 5,604,860 A | * | 2/1997 | McLaughlin et al. | 715/866 |
| 6,501,485 B1 | * | 12/2002 | Dash et al. | 715/700 |
| 6,744,527 B1 | * | 6/2004 | Dorsey et al. | 358/1.12 |
| 6,983,424 B1 | | 1/2006 | Dutta | |
| 2002/0080376 A1 | | 6/2002 | Momose et al. | |
| 2005/0111866 A1 | * | 5/2005 | Sato | 399/79 |
| 2006/0262338 A1 | | 11/2006 | Momose et al. | |
| 2008/0068636 A1 | | 3/2008 | Momose et al. | |

FOREIGN PATENT DOCUMENTS

| | | |
|---|---|---|
| JP | 7-182128 A | 7/1995 |
| JP | 11-102277 | 4/1999 |
| JP | 11-352844 | 12/1999 |
| JP | 2001-282415 | 10/2001 |
| JP | 2002-55807 A | 2/2002 |
| JP | 2002-182871 | 6/2002 |
| JP | 2004-185340 A | 7/2004 |
| JP | 2004-287886 A | 10/2004 |

\* cited by examiner

*Primary Examiner*—Ba Huynh
*Assistant Examiner*—Shashi K Becker
(74) *Attorney, Agent, or Firm*—Edwards Angell Palmer & Dodge LLP; David G. Conlin; William J. Daley, Jr.

(57) ABSTRACT

A host device includes: a basic screen display processing section which selects either a main setting screen or a list display setting screen as a setting screen in accordance with user's input and then causing the selected setting screen to show; a scroll processing section which causes the main setting screen to sequentially display advanced function icons respectively representing a plurality of available advanced functions in performing a print processing; and a list screen processing section which causes the list display setting screen to display a list of at least part of the advanced function icons. Thus, it is possible to cause the setting screens enhanced in convenience to show for different users in varying learning levels.

20 Claims, 25 Drawing Sheets

FIG. 2
| MANAGE-MENT NUMBER | ADVANCED FUNCTION NAME | ADVANCED FUNCTION ICON | DIALOG BOX | SETTING COMPLETION ICON | GROUP NAME |
|---|---|---|---|---|---|
| 1 | BINDING MARGIN CREATION |  | W1 |  | FINISHING |
| 2 | HOLE PUNCHING |  | W2 | 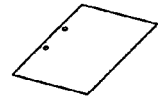 | FINISHING |
| 3 | STAPLING |  | W2 | 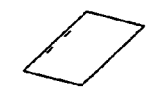 | FINISHING |
| 4 | POSTER COPYING |  | W3 |  | USEFUL FUNCTION |
| 5 | WATERMARK |  | W4 |  | USEFUL FUNCTION |
| ⋮ | ⋮ | ⋮ | ⋮ | ⋮ | ⋮ |

FIG. 3

| | DIALOG BOX |
|---|---|
| W1 | ☐ [booklet icon]<br>☐ [sheet icon]<br>`10 mm` ▲▼<br>[OK] |
| W2 | ☐ 1-POSITION STAPLING<br>☐ 2-POSITION STAPLING<br>☐ HOLE PUNCHING<br>[OK] |
| W3 | NUMBER OF SHEETS<br>`ZERO` ▼<br>☐ CLOSING LINES<br>☐ OVERLAP WIDTH<br>[OK] |
| W4 | WATERMARK:<br>`NOT PRINTED` ▼<br>[ADD] [UPDATE] [CANCEL]<br>TEXT:<br>`_____`<br>[FONT EDIT]<br>[OK] |
| ⋮ | ⋮ |

FIG. 4

| ADVANCED FUNCTION NAME | USAGE FREQUENCY IN PAST ONE WEEK |
|---|---|
| WATERMARK | 20 TIMES |
| BRIGHTNESS/ CONTRAST | 10 TIMES |
| HOLE PUNCHING | 2 TIMES |
| STAPLING | 5 TIMES |
| OVERLAYING | 3 TIMES |
| ⋮ | ⋮ |

FIG. 8

| ADVANCED FUNCTION NAME | USAGE TIME |
|---|---|
| WATERMARK | 2005.10.01  12:00 |
| BRIGHTNESS/ CONTRAST | 2005.10.01  12:00 |
| HOLE PUNCHING | 2005.10.01  12:00 |
| WATERMARK | 2005.09.30  15:00 |
| HOLE PUNCHING | 2005.09.30  15:00 |
| HOLE PUNCHING | 2005.09.30  10:00 |
| ⋮ | ⋮ |

FIG. 21

| STANDARD FUNCTION NAME | SPECIFIC CONDITIONS |
|---|---|
| COPY QUANTITY | 1 |
| PAPER SIZE | A4 |
| . . . | . . . |

| SETTING NO. | ADVANCED FUNCTION NAME | SPECIFIC CONDITIONS |
|---|---|---|
| 1 | STAPLING | 1 POSITION |
| 2 | WATERMARK | ... |
| . . . | . . . | . . . |

INFORMATION PROCESSING DEVICE, INFORMATION PROCESSING METHOD, PROGRAM, AND STORAGE MEDIUM

This Nonprovisional application claims priority under 35 U.S.C. § 119(a) on Patent Application No. 329170/2005 filed in Japan on Nov. 14, 2005, the entire contents of which are hereby incorporated by reference.

FIELD OF THE INVENTION

The present invention relates to an information processing device which causes a display device to display a setting screen for setting conditions for an operation performed in a target device, a program for operating the information processing device, and a storage medium storing the program.

BACKGROUND OF THE INVENTION

Conventionally, a printer driver has been known which causes display of a setting screen for setting print conditions in printing with a printer. On the setting screen, a user selects a desired print function from among a plurality of print functions and specifies specific conditions for the selected print function.

In recent years, with the trend toward more and more functions of a printer, types of print functions have increased. This requires the setting screen to include buttons and the like with which specific conditions for these multiple print functions are inputted. For example, the print functions are hierarchized, and only buttons corresponding to higher-level print functions are arranged on the setting screen. Then, buttons corresponding to lower-level print functions are displayed in response to a click on a button corresponding to a higher-level print function.

For example, Japanese Unexamined Patent Publication No. 352844/1999 (Tokukaihei 11-352844; published on Dec. 24, 1999) discloses a technique of displaying a setting screen of a hierarchy menu.

However, hierarchization of the print functions makes it difficult for the user to visually identify all the available icons. Particularly, a beginning user cannot recognize what kind of available functions exist.

It is to be noted that Japanese Unexamined Patent Publication No. 352844/1999 (Tokukaihei 11-352844; published on Dec. 24, 1999) also describes that a list of available functions included in an image forming apparatus is displayed. However, the list is organized by group of functions, such as a sorting function, a double-sided copy function, and a cardboard copy function. This requires the user to recognize which kind of function belongs to which group, which imposes inconvenience for the user.

In view of this, Japanese Unexamined Patent Publication No. 282415/2001 (Tokukai 2001-282415; published on Oct. 12, 2001) discloses a technique of (i) fixedly displaying a pointer at a predetermined position of a display screen and (ii) sequentially displaying a plurality of icons moving in a predetermined direction so that the icons pass through the predetermined position. The user selects a desired icon by the point when the desired icon is displayed at the predetermined position. Thus, all the icons are sequentially displayed, which allows the user to visually identify all the icons.

Japanese Unexamined Patent Publication No. 102277/1999 (Tokukaihei 11-102277; published on Apr. 13, 1999) discloses a technique of displaying on a screen a polygon with one icon for each side and rotating the polygon by 90 degrees by an operation of a pointing device to sequentially display icons placed on the sides of the polygon. With this arrangement, the user can visually identify all the icons by rotating the polygon.

An arrangement in which the icons are sequentially displayed as in the conventional art ensures the user to visually identify all the icons. This is convenient to beginning users who do not recognize functions represented by the icons.

However, in Japanese Unexamined Patent Publication No. 282415/2001 (Tokukai 2001-282415; published on Oct. 12, 2001), all the icons are sequentially displayed. This requires the user to wait until a desired icon appears. In Japanese Unexamined Patent Publication No. 102277/1999 (Tokukaihei 11-102277; published on Apr. 13, 1999), the user needs to operate the pointing device until a desired icon appears, which takes much time. This is inconvenient to a user who is thoroughly familiar with functions and information represented by the icons and wishes a desired icon to be displayed quickly.

SUMMARY OF THE INVENTION

An object of the present invention is to provide an information processing device capable of displaying a setting screen which is convenient to all users at varying learning levels.

In order to achieve the above object, an information processing device of the present invention is an information processing device which causes a display device to display a setting screen for setting conditions for an operation performed in a target device, the information processing device comprising: a setting screen switching section for selecting either a first setting screen or a second setting screen as the setting screen in accordance with user's input and then causing the selected setting screen to show; a first display processing section for causing the first setting screen to sequentially display first function pictures respectively representing a plurality of available functions in the target device performing the operation; and a second display processing section for causing the second setting screen to display a list of at least part of second function pictures respectively representing the plurality of functions.

According to the above arrangement, the setting screen switching section selects, in accordance with user's input, either (i) the first setting screen where the first function pictures respectively representing a plurality of available functions are sequentially displayed or (ii) the second setting screen where a list of the second function pictures respectively representing the functions are displayed, and then causes the display device to display the selected setting screen.

With this arrangement, a beginning user who does not recognize the advanced functions well can select the first setting screen where the first function pictures respectively representing the functions are sequentially displayed, by entering a command for displaying the first setting screen. Thus, the beginning user can confirm the first function pictures sequentially displayed so as to recognize what kind of functions are present and select a desired function.

Meanwhile, a skilled user who recognizes the functions well can select the second setting screen where a list of the second function pictures appears, by entering a command for displaying the second setting screen. Thus, the skilled user can readily select a second function picture corresponding to his/her desired function from the list of the second function pictures.

Thus, it is possible to cause the setting screens enhanced in convenience to show for different users in varying learning levels.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2 is an example of a content table which is stored by a content managing section included in the host device.

FIG. 3 is a view illustrating an example of a dialog box stored by the content managing section.

FIG. 4 is a view illustrating an example of a usage frequency table.

FIG. 8 is a view illustrating an example of history information stored in a usage frequency updating section.

FIG. 21 is a view illustrating an example of print conditions stored in the print conditions storage section.

DESCRIPTION OF THE EMBODIMENTS

The present invention relates to an information processing device which causes a display device to display a setting screen for setting conditions for an operation performed in a target device. Functions that the information processing device of the present invention set are, for example, print processing in a printer, information processing in various applications (e.g. word processing software, image editing software) and control processing with respect to a production apparatus. It is to be noted that the following will describe, as an embodiment of the present invention, an example of a device which performs settings of a plurality of functions with regard to print processing in a printer. However, the present invention is not limited to this.

The following will describe an embodiment of the present invention with reference to FIGS. 1 through 25(b).

(Overall Structure of Print System)

Figure 1:
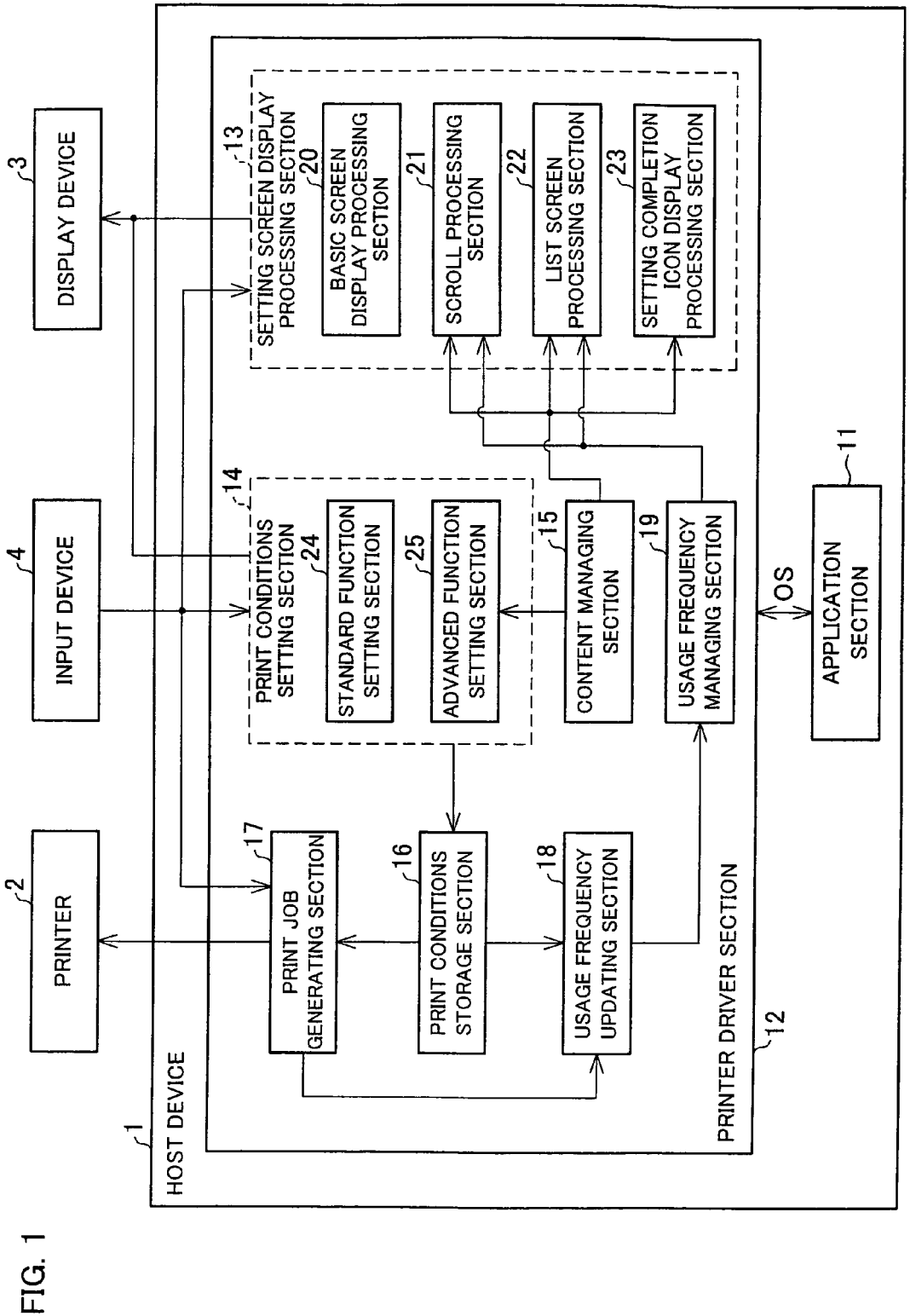
FIG. 1 is a block diagram illustrating an internal structure of (i) a host device according to an embodiment of the present invention and peripheral devices.

FIG. 1 is a block diagram illustrating a structure of a print system according to the present embodiment. As illustrated in FIG. 1, a print system of the present embodiment includes a host device (information processing device) 1, a printer (target device) 2, a display device 3, and an input device 4.

The host device 1 processes image data created by an application such as word processing software or image editing software into print data under print conditions which have been specified through user's entry, and generates a processing command for causing the printer 2 to perform a print processing. The host device 1 outputs a print job including generated print data and processing command to the printer 2. The host device 1 is a personal computer, for example.

The printer 2 creates an image corresponding to a print job transmitted from the host device 1 onto a recording medium such as paper, and then ejects the recording medium. It is to be noted that the host device 1 and the printer 2 are connected to each other through (i) a USB cable or the like cable (ii) or a communications network.

The display device 3 is a liquid crystal display, for example, and displays thereon an image under the control of the host device 1. The input device 4 is, for example, a mouse, a trackball, a trackpad, a tablet, or a keyboard. The input device 4 outputs to the host device 1 a command entered by a user. The above-mentioned input devices 4 are pointing devices, and designate positions on a display screen of the display device 3 under the control of the user.

(Structure of Host Device)

As illustrated in FIG. 1, the host device 1 includes an application section 11 and a printer driver section 12. It is to be noted that the host device 1 includes an operating system (OS) through which exchange of data and commands between blocks are realized.

The application section 11 performs processes in accordance with various applications (e.g. word processing software, spreadsheet software, image editing software) to generate image data. Upon receiving a command for setting print conditions from the input device 4, the application section 11 activates the printer driver section 12, causes the printer driver section 12 to set print conditions, and outputs generated image data to the printer driver section 12.

The printer driver section 12 is a functional block where a computing device such as a CPU performs operations in accordance with a program of the printer driver corresponding to the printer 2. The printer driver section 12 sets print conditions for printing image data outputted from the application section 11, and generates a print job according to the set print conditions.

The printer driver section 12 causes the display device 3 to show a print conditions setting screen, so as to urge a user to select print functions that the user wants and enter specific conditions of the print functions selected by the user. The printer driver section 12 sets print conditions in response to user's entry.

Here, examples of the print functions are:

Print copies setting function for setting the quantity of copies to be printed

Paper size setting function for setting a size of paper on which the printer 2 produces images Double-sided copy function for setting single-sided copying, double-sided copying, pamphlet printing and other type of copying.

N-UP copy function for printing a plurality (N-number) of pages on one sheet of paper Paper orientation setting function for setting paper orientations Fit-to-page function for enlarging or reducing an original image to fit a size of paper loaded Aspect ratio changing function for independently changing height and width of an image Poster copying function for dividing a one-page original image into split images and then printing the split images on different sheets of paper Overlaying function for overlaying one image on another for printing Watermark function for overlaying watermark such as "CONFIDENTIAL" "IMPORTANT" on an image for printing Edge-to-Edge function for printing an image of print data in a maximum printable area 180-degree rotation function for rotating image to be printed at 180 degree Line width adjusting function for adjusting line width Hole punching function for forming punched holes at the edge of a sheet printed Stapling function for stapling a plurality of sheets printed Binding margin creating function for printing with a binding margin at the edge of a sheet OHP interleaving function for putting a sheet of paper between pages of print data.

The print functions are classified into (i) standard functions used under specific conditions for printing (In the present embodiment, print copies setting function, paper size setting function, double-sided copy function, N-up copy function, and paper orientation setting function) and (ii) advanced functions.

The print conditions include specific conditions for the standard functions and specific conditions for advanced functions selected by a user.

As illustrated in FIG. 1, the printer driver section 12 includes a setting screen display processing section 13, a print conditions setting section 14, a content managing section (storage device) 15, a print conditions storage section 16, a print job generating section (target device) 17, a usage frequency updating section (calculation means) 18, and a usage frequency managing section 19.

The setting screen display processing section 13 performs a process of causing the display device 3 to display a setting screen for urging a user to specify print conditions. The setting screen display processing section 13 includes a basic screen display processing section (setting screen switching means) 20, a scroll processing section (first display processing means) 21, a list screen processing section 22, and a setting completion icon display processing section (setting completion picture display processing means) 23.

The print conditions setting section 14 receives user's entry to a setting screen from the input device 4, and then sets print conditions in accordance with the user's entry. The print conditions setting section 14 includes a standard-function setting section 24 and an advanced function setting section (function setting means) 25.

The following will describe the blocks.

The content managing section 15 manages advanced function icons representing a plurality of advanced functions, respectively. As illustrated in FIGS. 2 and 3, the content managing section 15 manages a table of the advanced functions. The table includes, for each advanced function, (i) identification information that identifies the advanced function (herein, advanced function name), (ii) an advanced function icon, (iii) a dialog box for inputting specific conditions for the advanced function, (iv) a setting completion icon representing that setting of the advanced function has been completed, and (v) name of group (group name) to which the advanced function belongs, all of which are associated with each other.

The group names in the present embodiment are "Finishing", "Image adjustment", and "Useful function".

The group "Finishing" includes advanced functions associated with finishing touches given to a recording medium such as a printed sheet of paper. For example, the group "Finishing" includes "hole punching", "stapling", "binding margin creation", and "sheet inserting". The group "Image adjustment" includes advanced functions associated with control of an image to be printed. For example, the group "Image adjustment" includes "resolution", "smoothing", and "contrast". The group "Useful function" includes advanced functions which do not belong to both the groups "Finishing" and "Image adjustment". For example, the group "useful function" includes "fit-to-page", "overlaying", and "poster copying". Such classification of the advanced functions into groups, which is not the only possibility, can be changed appropriately.

The usage frequency managing section 19 manages a usage frequency table that indicates usage frequencies for the advanced functions. In the present embodiment, the usage frequency managing section 19 manages the number of times an advanced function has been used in the past one week, as a usage frequency for each advanced function. It is to be noted that the usage frequency is not limited to this. FIG. 4 is a view illustrating an example of the usage frequency table managed by the usage frequency managing section 19.

The basic screen display processing section 20 shows either a main setting screen (first setting screen) or a list display setting screen (second setting screen) as a setting screen, according to user's entry. However, the basic screen display processing section 20 shows the main setting screen at start-up.

Figure 5:
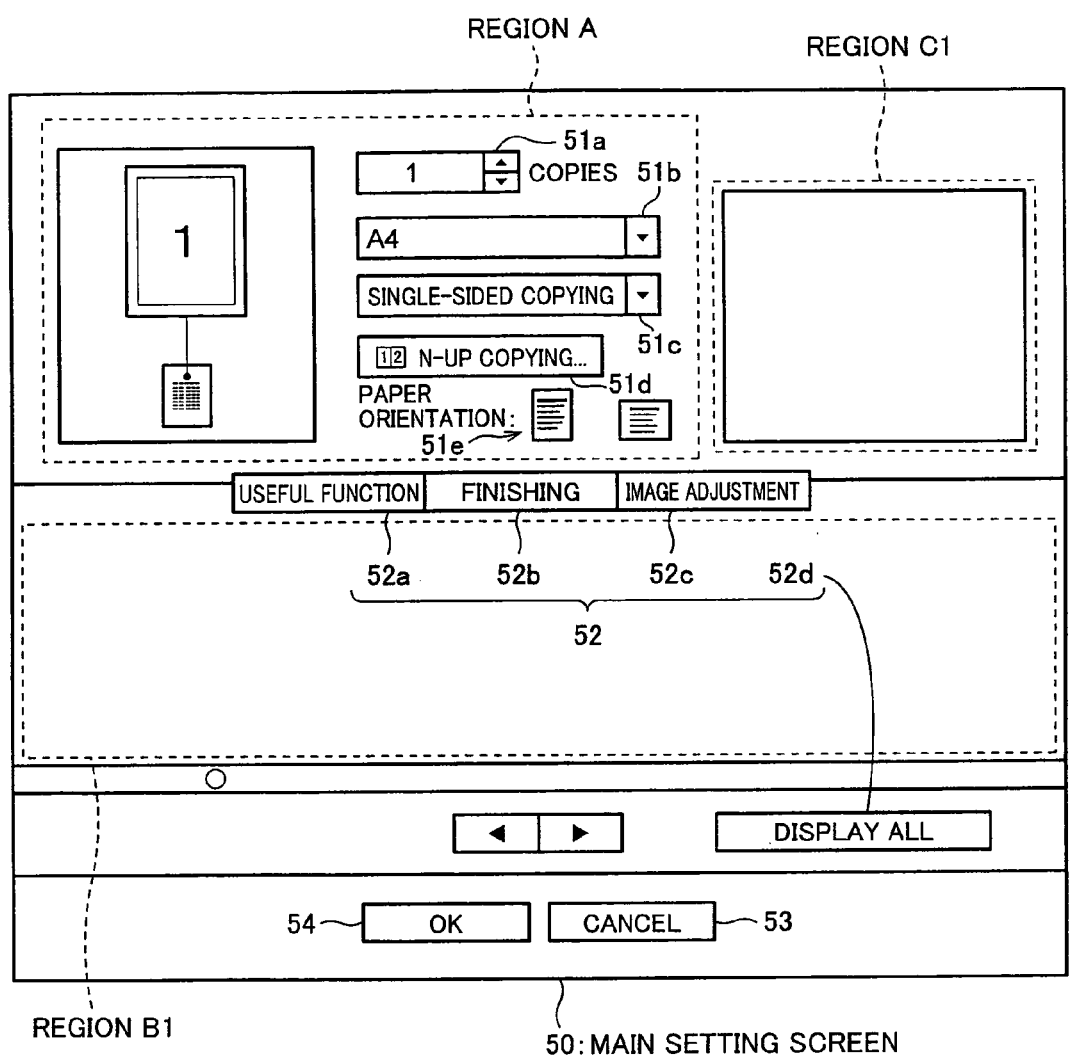
FIG. 5 is a view illustrating an example of a main setting screen.

As illustrated in FIG. 5, a main setting screen 50 includes regions A, B1, and C1. The region A includes input buttons 51*a* through 51*e* with which specific conditions for standard functions are specified. The region B1 sequentially displays the advanced function icons in a predetermined direction (herein, from the right toward the left). The region C1 displays a list of the setting completion icons corresponding to advanced functions of which settings have been completed.

Figure 6:
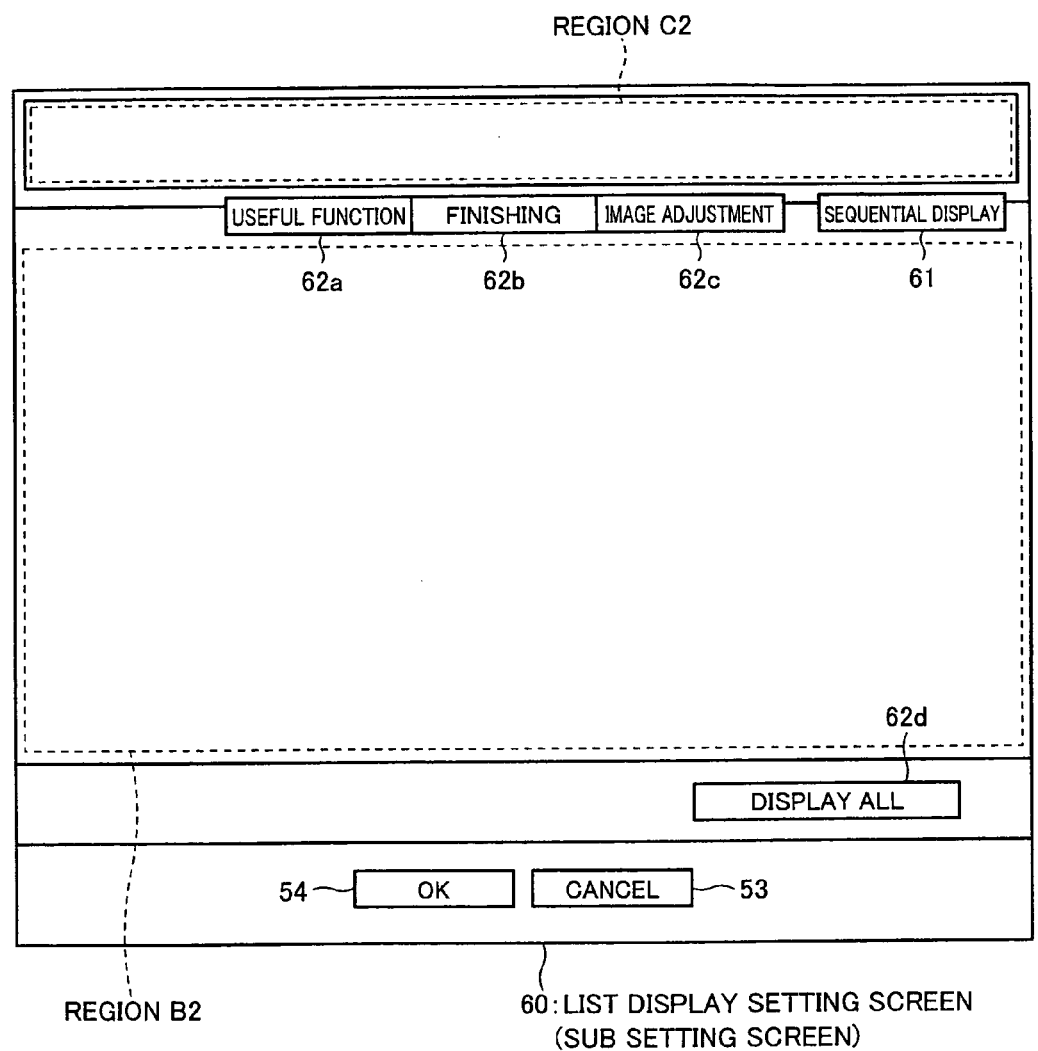
FIG. 6 is a view illustrating an example of a list display setting screen.

Meanwhile, as illustrated in FIG. 6, the list display setting screen 60 includes regions B2 and C2. The region B2 displays a list of the advanced function icons. The region C2 displays a list of the setting completion icons corresponding to advanced functions of which settings have been completed.

It is to be noted that the basic screen display processing section 20 causes only boxes surrounding the regions B1, B2, C1, and C2 to display. As will be described later, the scroll processing section 21, the list screen processing section 22, and the setting completion icon display processing section 23 cause contents of the regions B1, B2, C1, and C2 to display.

The scroll processing section 21 performs a process of causing the region B1 of the main setting screen 50 to sequentially display a plurality of advanced function icons while causing the advanced function icons to move in a predetermined direction (herein, from the right to the left).

More specifically, the scroll processing section 21 reads out all the advanced function icons from the content managing section 15, and then causes the region B1 to sequentially display the advanced function icons thus read with movement in descending order of usage frequency managed by the usage frequency managing section 19.

Figure 7:
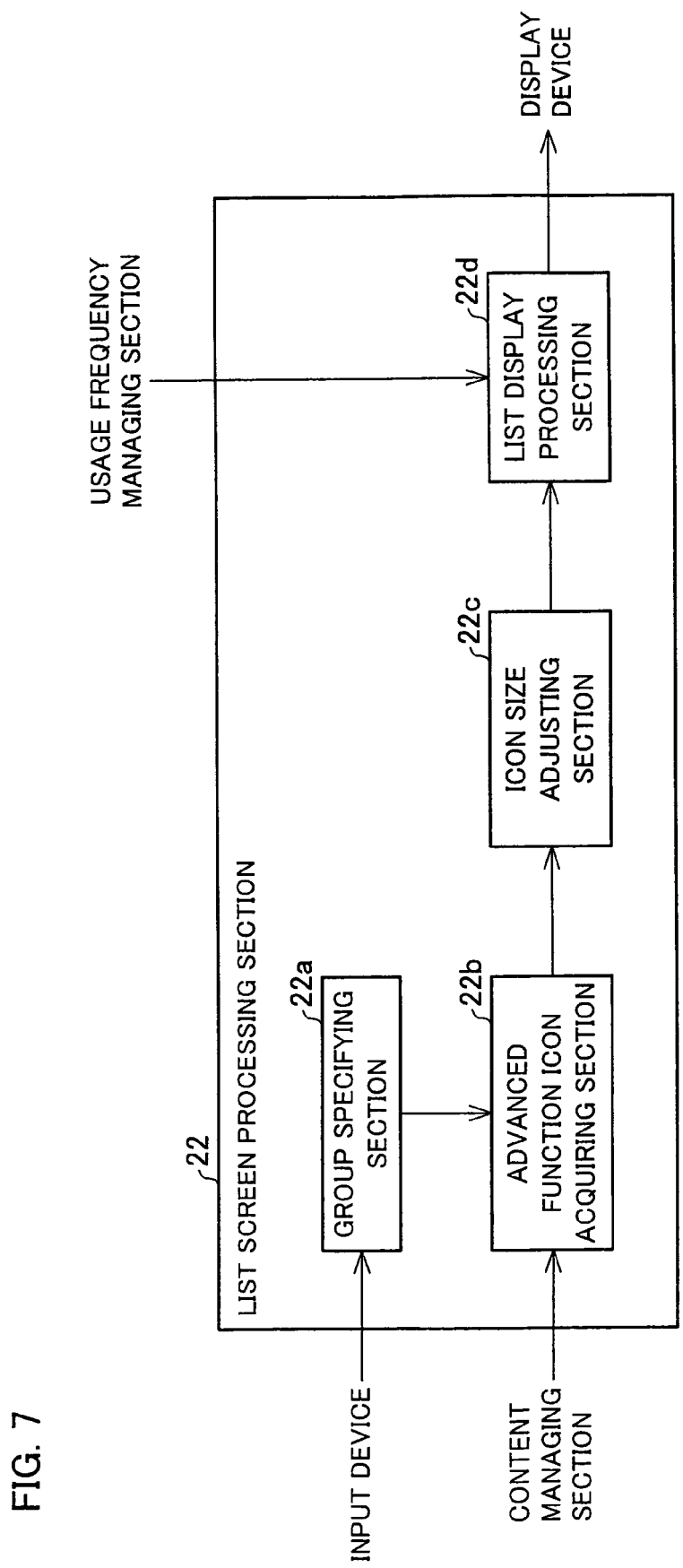
FIG. 7 is a block diagram illustrating an internal structure of a list screen processing section.

The list screen processing section 22 performs a process of causing the region B2 of the sub setting screen to display a list of the advanced function icons. As illustrated in FIG. 7, the list screen processing section 22 includes a group specifying section (designating means) 22a, an advanced function icon acquiring section (function picture acquiring means) 22b, an icon size adjusting section (adjustment means) 22c, and a list display processing section (second display processing means) 22d.

According to user's entry, the group specifying section 22a specifies a group of the advanced function icons displayed in list form in the region B2 of the list display setting screen 60, and then outputs a group name of the thus specified group to the advanced function icon acquiring section 22b.

The advanced function icon acquiring section 22b reads out from the content managing section 15 an advanced function icon which belongs to the group name having been received from the group specifying section 22a.

The icon size adjusting section 22c adjusts sizes of the advanced function icons so that the advanced function icons having been read out by the advanced function icon acquiring section 22b can be displayed in the region B2 without being overlaid. A process of adjusting sizes of the advanced function icons will be described in detail later.

The list display processing section 22d arranges the advanced function icons having been subjected to size adjustment in sequence in descending order of usage frequency managed by the usage frequency managing section 19, and causes the region B2 to display a list of the advanced function icons.

The standard function setting section 24 sets specific conditions for the standard functions according to manipulation of the input buttons 51a through 51e displayed in the region A of the main setting screen 50. The standard function setting section 24 stores the set specific conditions for the standard functions into the print conditions storage section 16.

In response to a click of an advanced function icon provided in the main setting screen 50 or the list display setting screen, the advanced function setting section 25 reads out from the content managing section 15 a dialog box and an advanced function name both of which correspond to the clicked advanced function icon. Further, the advanced function setting section 25 causes the display device 3 to display the dialog box so as to urge a user to enter specific conditions, and sets specific conditions according to commands inputted to the input device 4. As to the advanced function of which settings has been completed, the advanced function setting section 25 stores the advanced function name and its specific conditions into the print conditions storage section 16 in such a manner that the advanced function name and the specific conditions are associated with each other.

The print conditions storage section 16 stores specific conditions set for the print functions. It is to be noted that the print conditions storage section 16 stores defaults of the specific conditions for the standard functions upon startup. The specific conditions for the standard functions stored in the print conditions storage section 16 are updated by the standard function setting section 24. Further, as to advanced functions of which specific conditions have been set by the advanced function setting section 25, the print conditions storage section 16 stores an advanced function name and specific conditions therein in such a manner that the advanced function name and the specific conditions are associated with each other.

The setting completion icon display processing section 23 reads out all the advanced function names stored in the print conditions storage section 16, and then reads out from the content managing section 15 setting completion icons corresponding to the thus read advanced function names. Subsequently, the setting completion icon display processing section 23 causes the region C1 to display all the setting completion icons thus read out when the main setting screen 50 is shown, or causes the region C2 to display all the setting completion icons thus read out when the list display setting screen 60 is shown.

The print job generating section 17 generates a print job in response to a print start command inputted to the input device 4. More specifically, the print job generating section 17 acquires image data to be printed from the application section 11, and reads out specific conditions for all the print functions stored in the print conditions storage section 16. The print job generating section 17 processes the thus acquired image data into print data according to the thus read specific conditions for the print functions, and generates a processing command to be provided to the printer 2. The print job generating section 17 outputs a print job including the generated print data and processing command to the printer 2. Further, upon receiving the print start command, the print job generating section 17 outputs an update command to the usage frequency updating section 18.

The usage frequency updating section 18 updates a usage frequency managed by the usage frequency managing section 19. More specifically, in response to the update command from the print job generating section 17, the usage frequency updating section 18 reads out the advanced function name of the advanced function of which settings have been completed from the print conditions storage section 16, and then stores history information including (i) the advanced function and (ii) an input time of the print start command (usage time) both of which are associated with each other. FIG. 8 is a view illustrating an example of the history information.

Further, according to the history information, the usage frequency updating section 18 calculates, for each advanced function, a usage frequency in the past predetermined period of time (e.g. one week) preceding a current time, and updates the usage frequency table managed by the usage frequency managing section 19.

(Flow of an Entire Print Conditions Setting Process)

Figure 9:
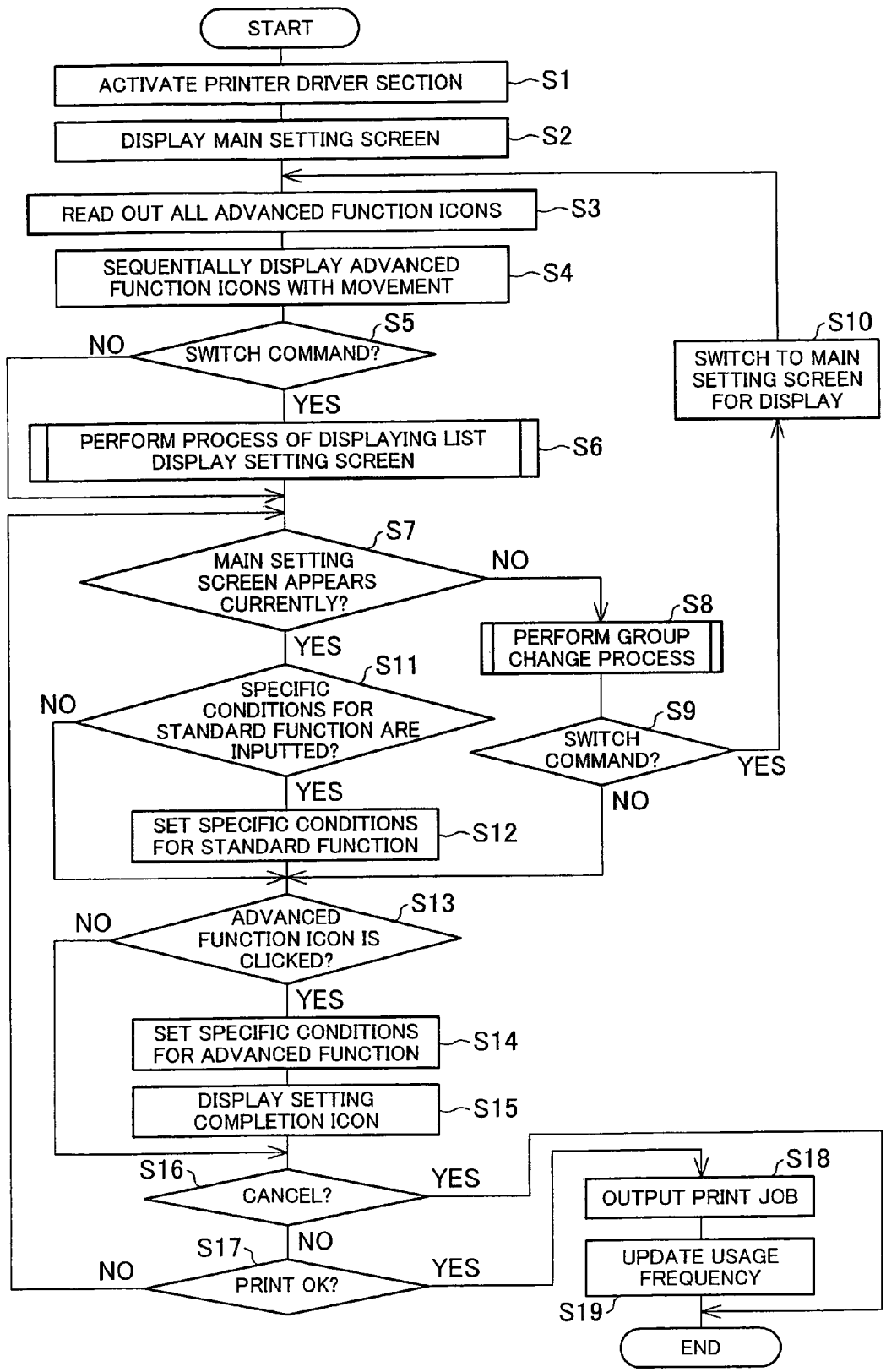
FIG. 9 is a flowchart illustrating a flow of an entire process performed by a printer driver section.

The following will describe a flow of an entire process performed by the printer driver section 12 with reference to a flow chart of FIG. 9.

First of all, the printer driver section 12 is activated in response to a request from the application section 11 (S1).

Then, as illustrated in FIG. 5, the basic screen display processing section 20 shows the main setting screen 50 including: the region A including the input buttons 51a through 51e corresponding to the specific conditions for the standard functions; the region B1 where the advanced function icons with movement are displayed; and the region C1 where the setting completion icons are displayed (S2).

Next, the scroll processing section 21 reads out all the advanced function icons and the advanced function names from the content managing section 15 (S3).

Thereafter, referring to usage frequencies of the advanced functions managed by the usage frequency managing section 19, the scroll processing section 21 causes the region B1 of the main setting screen 50 to sequentially display advanced function icons starting from an advanced function icon corresponding to the name of the advanced function which is used with a highest frequency (S4) while moving the advanced function icons in a predetermined direction (herein, in a direction from a right end toward a left end).

Figure 10:
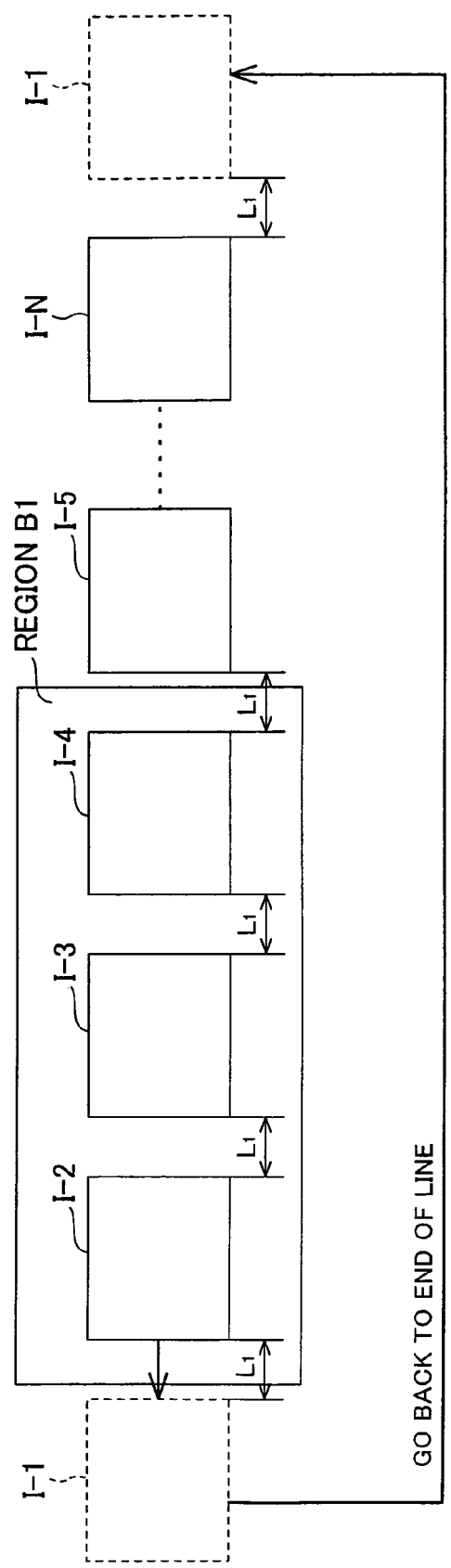
FIG. 10 is a view illustrating a process of sequentially displaying advanced function icons while causing the advanced function icons to move.

FIG. 10 illustrates a process of the scroll processing section 21 causing the region B1 to sequentially display advanced function icons. As illustrated in FIG. 10, the scroll processing section 21 displays advanced function icons I at a predetermined interval L1. The scroll processing section 21 displays an advanced function icon I–n which is used at a n-th highest frequency while moving the advanced function icon I–n from the right-side edge to the left-side edge of the region. When a distance between the advanced function icon I–n and the right-side edge of the region B becomes L1, the scroll processing section 21 causes an advanced function icon I–(n+1), which is used at a n+1th highest frequency, to be shown up from the right-side edge of the region B. When the scroll processing section 21 moves the advanced function icon I–n positioning at the top of the region B1 (i.e. advanced function icon I–n positioning on a leftmost side of the region B1) to the left-side edge of the region B, the scroll processing section 21 stops displaying the advanced function icon I–n and then causes the advanced function icon I–n to show up again after all the other advanced function icons are shown up.

Figure 11:
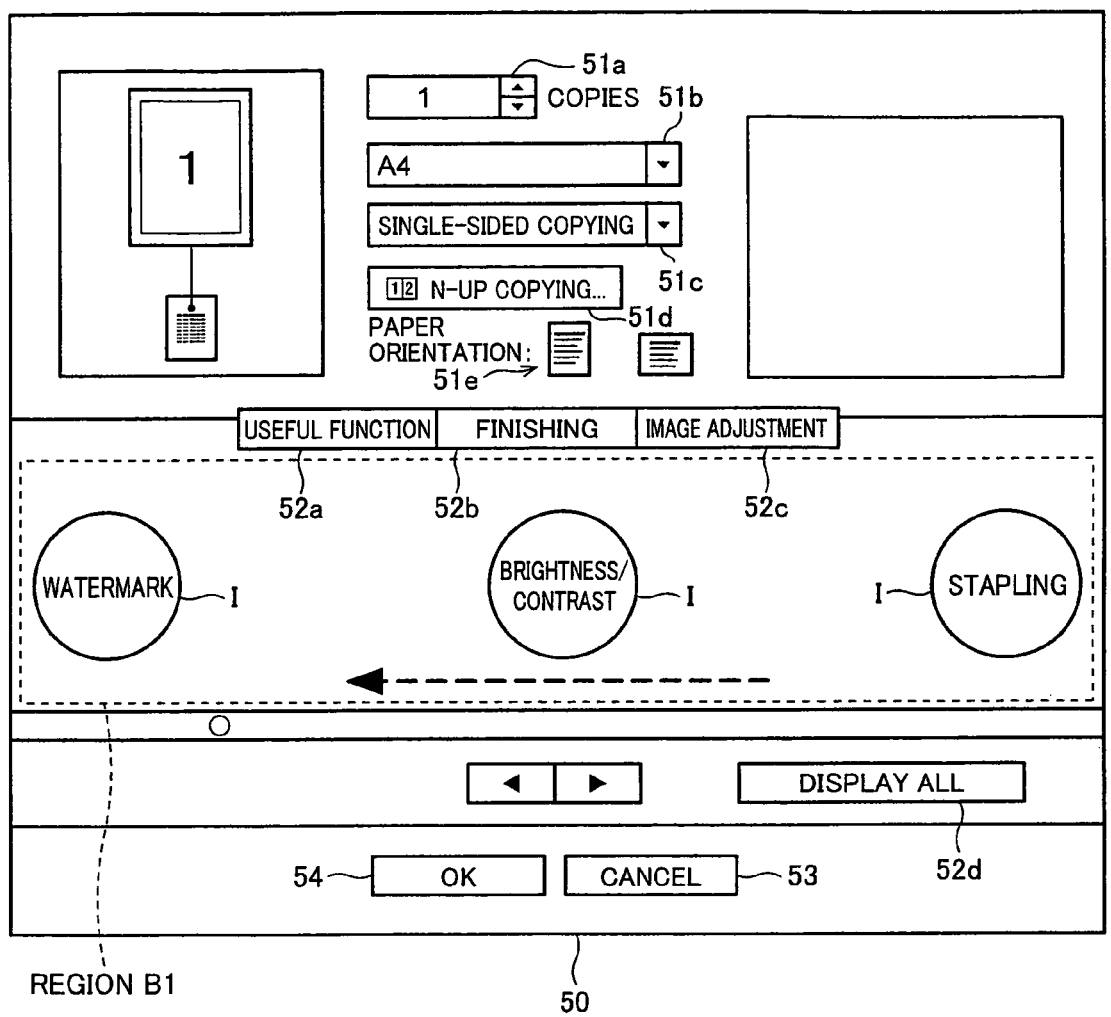
FIG. 11 is a view illustrating an example of a main setting screen where the advanced function icons are displayed.

FIG. 11 is a view illustrating an example of the main setting screen 50 in cases where the usage frequency managing section 19 manages the usage frequency table illustrated in FIG. 4. As illustrated in FIG. 11, the scroll processing section 21 causes the region B1 to sequentially display the advanced function icons in descending order of usage frequency.

Next, the basic screen display processing section 20 determines whether a command for switching to the list display setting screen 60 has been inputted to the input device 4 (S5). More specifically, the basic screen display processing section 20 determines that the command for switching to the list display setting screen 60 has been inputted, when any of switch buttons 52 for switching to the list display setting screen 60 has been clicked in the main setting screen 50 (In the present embodiment, the switch button 52 includes "USEFUL FUNCTION" button 52a, "FINISHING" button 52b, "IMAGE ADJUSTMENT" button 52c, and "DISPLAY ALL" button 52d).

When any of the switch buttons 52 has been clicked (Yes in S5), the basic screen display processing section 20 and the list screen processing section 22 perform a process of displaying the list display setting screen 60 (S6). The process of displaying the list display setting screen 60 will be described in detail later.

Next, the printer driver section 12 determines whether a currently shown setting screen is the main setting screen 50 (S7).

When the list display setting screen 60 currently appears (No in S7), the list screen processing section 22 determines whether a command for changing a group of advanced function icons to be displayed in list form has been inputted. When the group change command has been inputted, the list screen processing section 22 performs a process of changing advanced function icons to be displayed in list form (S8). The process performed in S8 will be described in detail later.

Thereafter, the basic screen display processing section 20 determines whether a command for switching to the main setting screen 50 has been inputted (S9). In the present embodiment, the basic screen display processing section 20 determines that the command for switching to the main setting screen 50 has been inputted, when a "SEQUENTIAL DISPLAY" button 61 (see FIG. 6) in the list display setting screen 60 has been clicked.

When the command for switching to the main setting screen 50 has been inputted (Yes in S9), the basic screen display processing section 20 switches a display from the list display setting screen 60 to the main setting screen 50 (S10), and returns to S3. When the command for switching to the main setting screen 50 has not been inputted (No in S9), the procedure proceeds to S13.

On the other hand, when the main setting screen 50 currently appears (Yes in S7), the standard function setting section 24 determines whether any of the input buttons 51a through 51e (see FIGS. 5 and 11) corresponding to the specific conditions for the standard functions, displayed in the region A of the main setting screen 50 has been clicked (S11).

If any of the input buttons 51a through 51e, even one of them is clicked (Yes in S11), the standard function setting section 24 updates specific conditions for a standard function, stored in the print conditions storage section 16, according to user's input (S12). On the other hand, if none of the input buttons 51a through 51e are clicked (No in S11), the procedure proceeds to S13.

Next, in S13, the advanced function setting section 25 determines whether any of the advanced function icons displayed in the region B1 of the main setting screen 50 or the region B2 of the list display setting screen 60 is clicked.

If any of the advanced function icons is clicked (Yes in S13), the advanced function setting section 25 reads out from the content managing section 15 (i) a dialog box used for input of specific conditions and (ii) an advanced function name, both of which correspond to the clicked advanced function icon. Then, the advanced function setting section 25 causes the display device 3 to display the thus read dialog box thereon. Subsequently, according to user's input to the dialog box, the advanced function setting section 25 sets specific conditions for the advanced function indicated by the clicked advanced function icon, and then stores advanced function setting information into the print conditions storage section 16 (S14). The advanced function setting information includes the specific conditions set for the advanced function and the advanced function name both of which are associated with each other.

Thereafter, the setting completion icon display processing section 23 detects that a new advanced function setting information has been stored in the print conditions storage section 16, and then reads out from the print conditions storage section 16 the advanced function name of the advanced function indicated by the advanced function setting information. Then, the setting completion icon display processing section 23 reads out from the content managing section 15 the setting completion icon corresponding to the read advanced function name, and then causes the setting screen to display the read setting completion icon (S15).

In cases where the main setting screen 50 appears, the setting completion icon display processing section 23 causes the region C1 to display the setting completion icon. In cases where the sub-setting screen appears, the setting completion icon display processing section 23 causes the region C2 to display the setting completion icon.

Thereafter, the procedure proceeds to S16. Also, if none of the advanced function icons are clicked (No in S13), the procedure proceeds to S16.

In S16, the printer driver section 12 determines whether the setting cancel button 53 for print conditions (see FIGS. 5, 6, and 11) is clicked.

If the setting cancel button 53 is clicked (Yes in S16), the printer driver section 12 terminates the procedure.

If the setting cancel button 53 is not clicked (No in S16), the print job generating section 17 determines whether a completion-of-setting button 54 for print conditions (see FIGS. 5, 6, and 11) is clicked (S17).

If the completion-of-setting button 54 is not clicked (No in S17), the procedure returns to S7. On the other hand, if the completion-of-setting button 54 is clicked (Yes in S17), the print job generating section 17 obtains image data to be printed from the application section 11 and reads out from the print conditions storage section 16 the specific conditions set for the print functions. Then, according to the read specific conditions for the print functions, the print job generating section 17 processes image data into print data, generates a processing command to be given to the printer 2, and outputs to the printer 2 a print job including the generated print data and processing command (S18).

Further, when the completion-of-setting button 54 is clicked, the print job generating section 17 outputs an update command to the usage frequency updating section 18. Then, the usage frequency updating section 18 having been received the update command reads out from the print conditions storage section 16 the advanced function name (i.e. the advanced function name of the advanced function whose specific conditions have been set), and stores history information including (i) the advanced function name and (ii) time when the update command has been received (i.e. time when the advanced function is used) both of which are associated with each other. Subsequently, in accordance with the history information stored in the usage frequency updating section 18, the usage frequency updating section 18 calculates the number of times the advanced function has been used for the past one week for each advanced function, and then updates a usage frequency managed by the usage frequency managing section 19 (S19). Then, the procedure is terminated.

(Process for Switching to a Sub-setting Screen)

Figure 12:
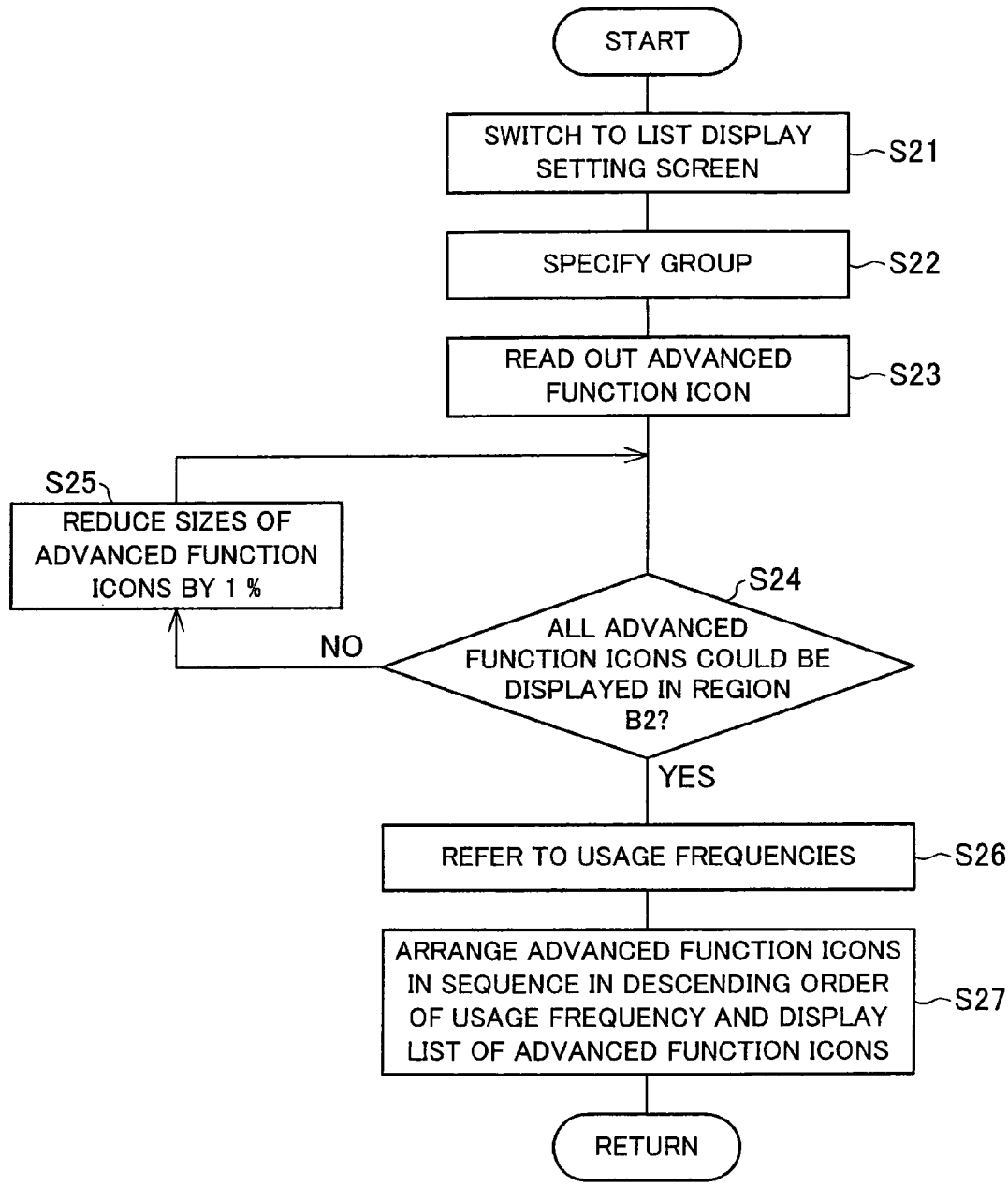
FIG. 12 is a flow chart illustrating a flow of a process of switching to a list display setting screen.

Next, referring to a flowchart illustrated in FIG. 12, the following will describe a flow of a process for switching to the list display setting screen 60 indicated in S6.

First of all, the basic screen display processing section 20 changes the setting screen appearing on the display device 3 from the main setting screen 50 to the list display setting screen 60 as illustrated in FIG. 6, i.e. the list display setting screen 60 including the region B2 where a list of the advanced function icons appears and the region C2 where a setting completion icon corresponding to an advanced function settings of which have been completed appears (S21).

Figure 13:
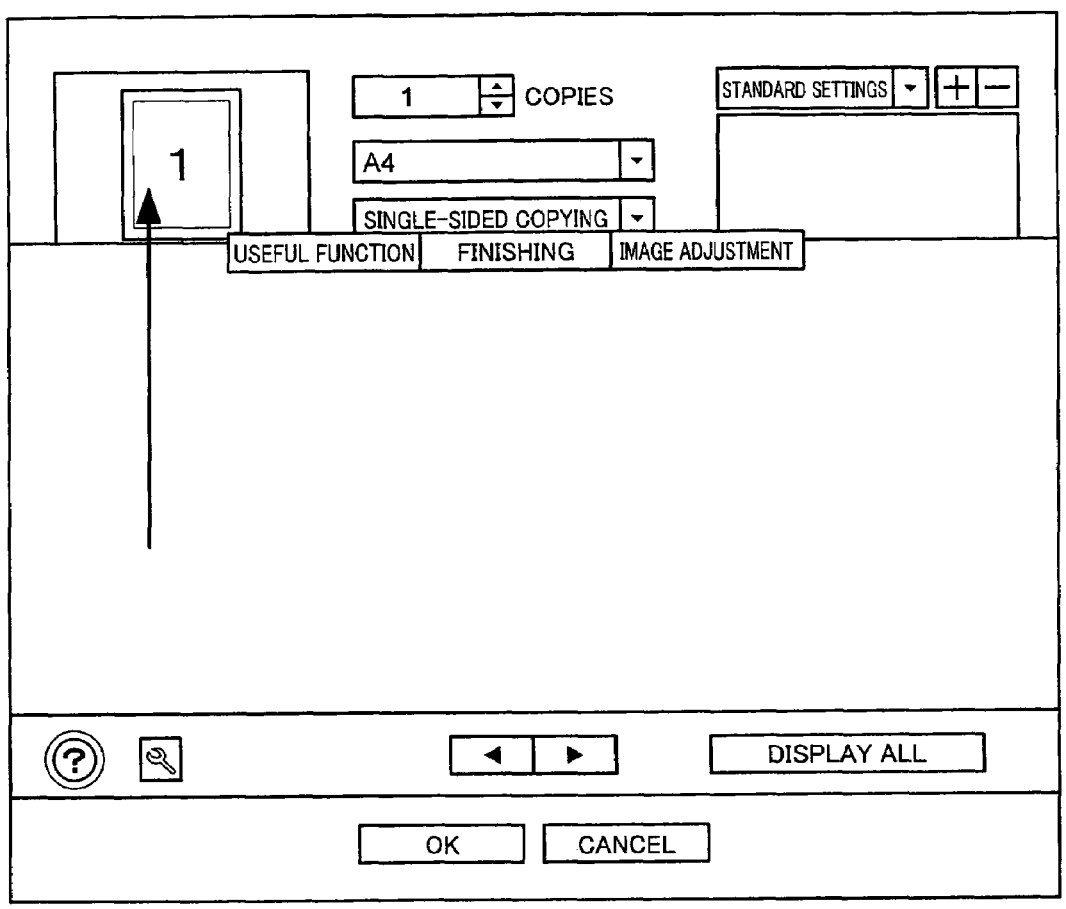
FIG. 13 is a view illustrating a change from the main setting screen to the list display setting screen.

At this moment, as indicated by an arrow in FIG. 13, the basic screen display processing section 20 may continuously enlarge the region B1 of the main setting screen 50 to the region B2 so as to change to the list display setting screen 60.

Next, the group specifying section 22a of the list screen processing section 22 specifies a group of advanced function icons to be displayed in list form, in accordance with the clicked switch button 52, and then outputs the group name of the specified group to the advanced function icon acquiring section 22b (S22).

More specifically, when the "USEFUL FUNCTION" button 52a (see FIGS. 5 and 11) is clicked, the group specifying section 22a outputs the group name "Useful function". When the "FINISH" button 52b is clicked, the group specifying section 22a outputs the group name "Finish". When the "IMAGE ADJUSTMENT" button 52c is clicked, the group specifying section 22a outputs the group name "Image adjustment". When the "DISPLAY ALL" button 52d is clicked, the group specifying section 22a outputs the group name "All".

Next, the advanced function icon acquiring section 22b reads out from the content managing section 15 (i) the advanced function icon corresponding to the group name having been received from the group specifying section 22a and (ii) the advanced function name (S23). It is to be noted that when receiving the group name "All", the advanced function icon acquiring section 22b reads out all the advanced function icons managed by the content managing section 15.

Next, the icon size adjusting section 22c determines whether all the advanced function icons having been read out by the advanced function icon acquiring section 22b could be displayed in the region B2 without overlapping (S24).

For example, the icon size adjusting section 22c compares (i) the number of pixels required for a case where all the advanced function icons having been read out by the advanced function icon acquiring section 22b are arranged at predetermined intervals and (ii) the number of all pixels in the region B2. If (i) the number of pixels required is smaller than (ii) the number of all pixels in the region B2, the icon size adjusting section 22c judges that all the advanced function icons could be displayed in the region B2.

If all the advanced function icons having been read out by the advanced function icon acquiring section 22b could not be displayed in the region B2 (No in S24), the icon size adjusting section 22c reduces the size of each of the advanced functions by 1% (S25). Thereafter, the procedure returns to S24.

On the other hand, if all the advanced function icons having been read out by the advanced function icon acquiring section 22b could be displayed in the region B2 (Yes in S24), the icon size adjusting section 22c outputs (i) the advanced function icons having been read out by the advanced function icon acquiring section 22b (or the advanced function icons sizes of which have been changed, if size adjustment of the icons has been performed) and (ii) the advanced function names to the list display processing section 22d.

Figure 14:
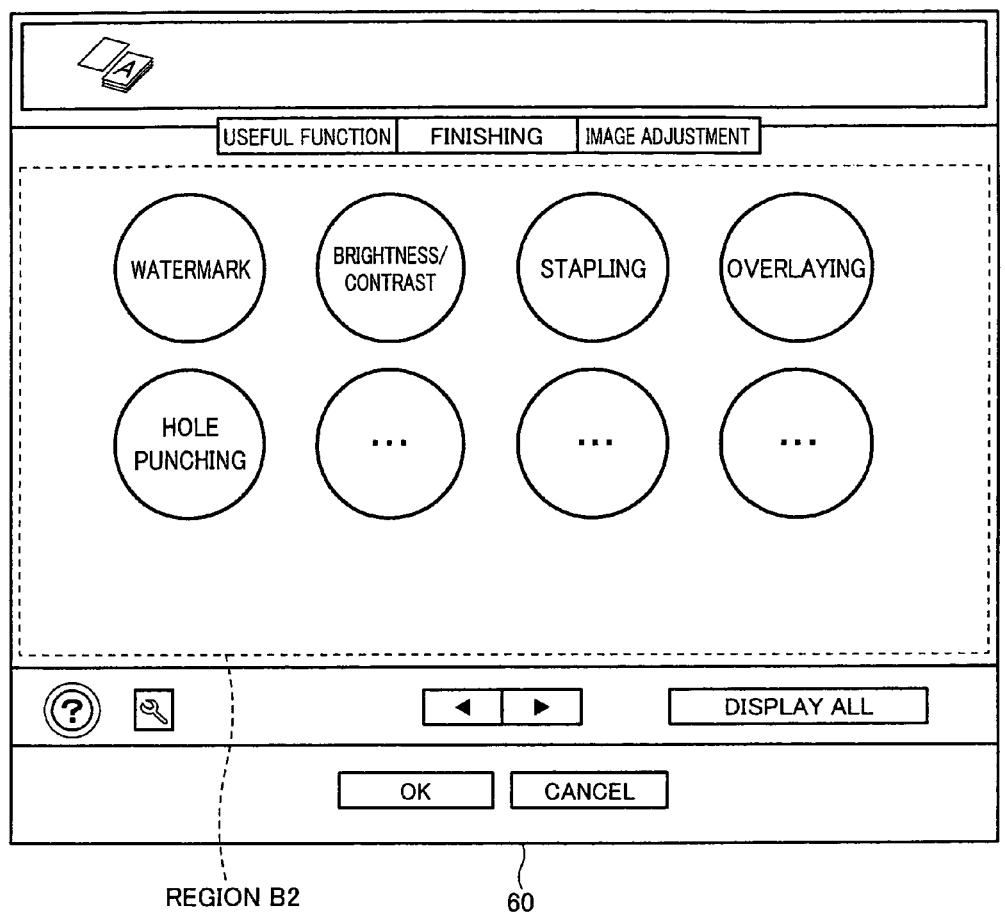
FIG. 14 is a view illustrating an example of the list display setting screen in a case where the usage frequency managing section manages the usage frequency table illustrated in FIG. 4.

Then, the list display processing section 22d reads out from the usage frequency managing section 19 usage frequencies corresponding to the advanced function names having been read out from the content managing section 15 (S26), and then causes the region B2 to arrange the advanced function icons having been received from the icon size adjusting section 22c in sequence in descending order of usage frequency so as to display the advanced function icons (S27). FIG. 14 is a view illustrating an example of the list display setting screen 60 in cases where the usage frequency managing section 19 manages the usage frequency table illustrated in FIG. 4 and the "DISPLAY ALL" button 52d has been clicked. As illustrated in FIG. 14, the list display processing section 22*d* arranges the advanced function icons in sequence in descending order of usage frequency to display them in the region B2.

This is the end of the process for switching to the list display setting screen 60, and the procedure returns to S7.

Figure 15:
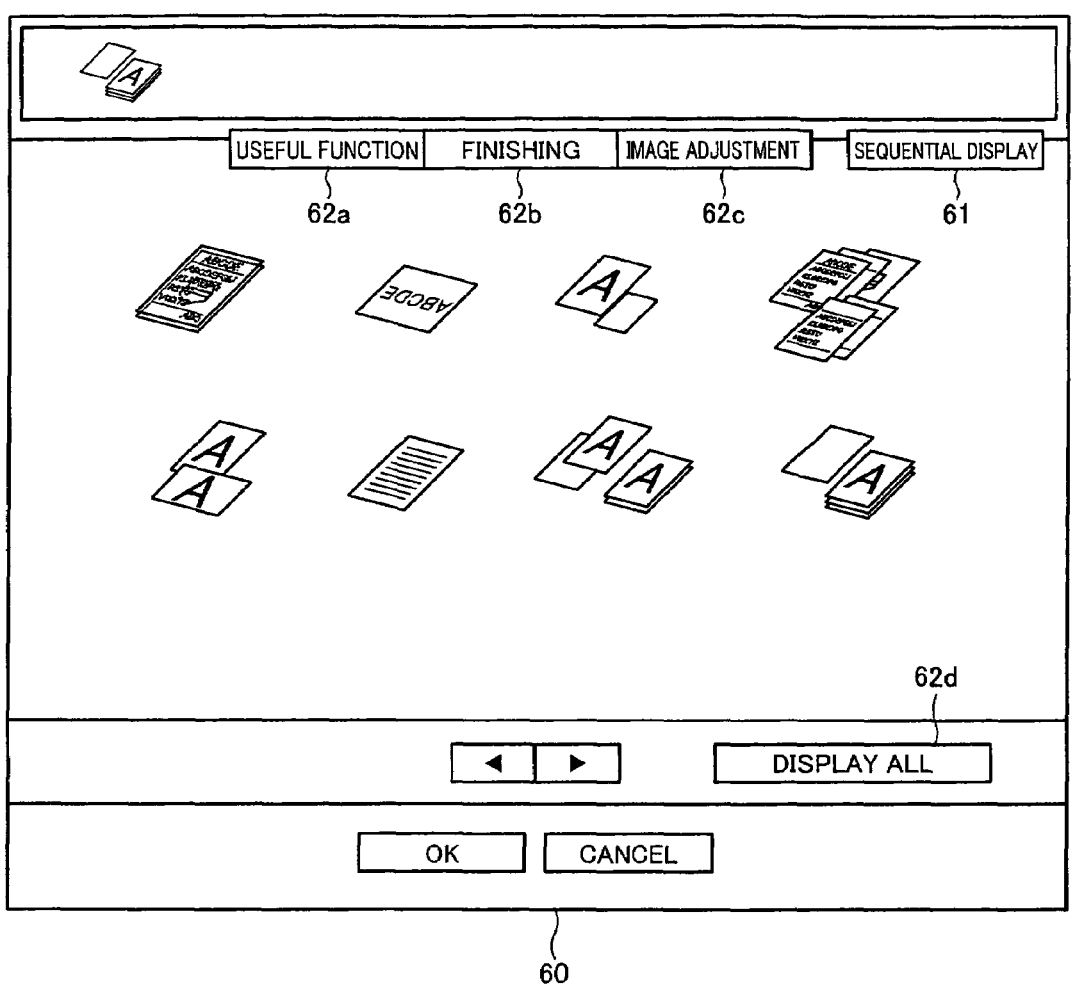
FIG. 15 is a view illustrating an example of the list display setting screen where a list of advanced function icons belonging to a group "USEFUL FUNCTION" is displayed.

FIG. 15 is a view illustrating an example of the list display setting screen 60 in cases where the "USEFUL FUNCTION" button 52*a* is clicked. Here, assume that only eight advanced function icons which belong to the group "Useful function" have been registered in the content managing section 15. In this case, the icon size adjusting section 22*c* judges that all the advanced function icons having been read out from the content managing section 15 can be displayed in the region B2 without being changed their sizes.

Figure 16:
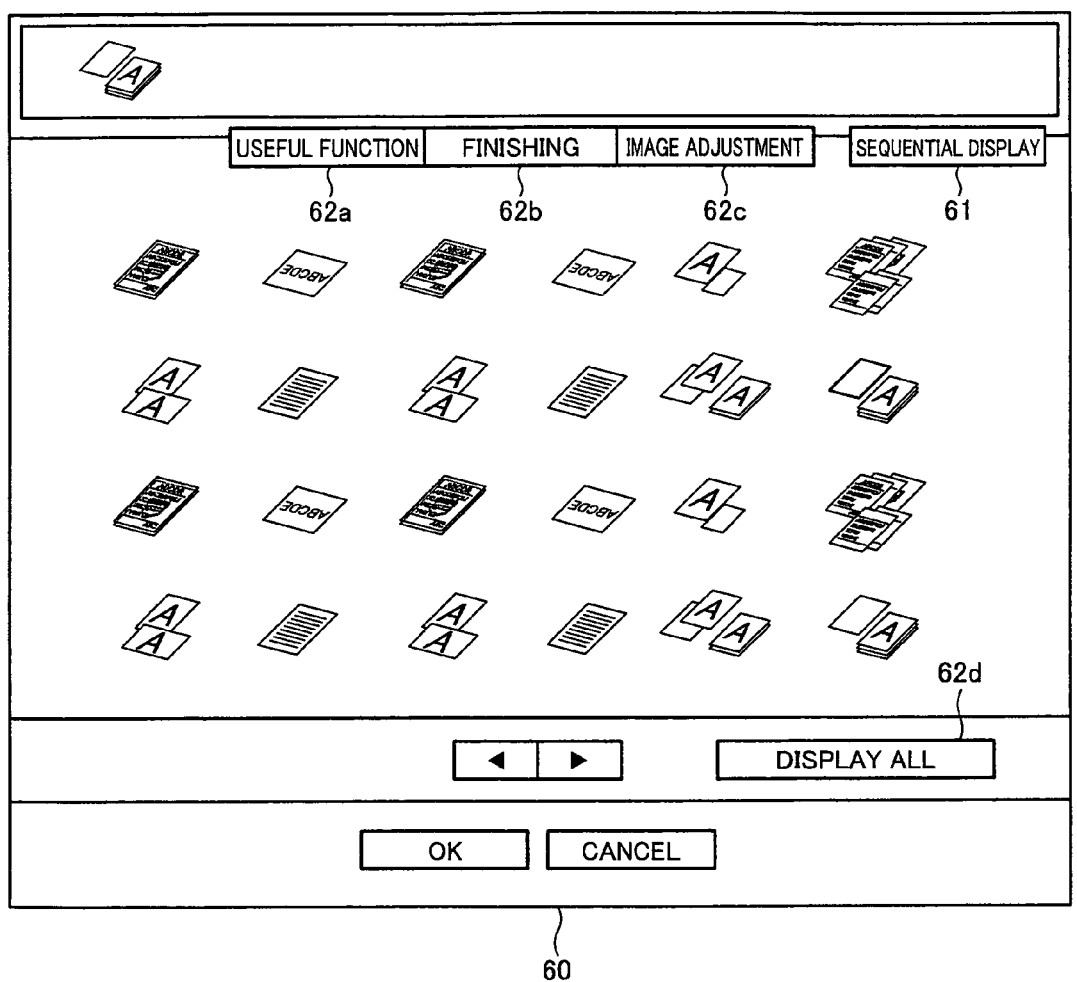
FIG. 16 is a view illustrating an example of the list display setting screen where a list of all advanced function icons is displayed.

Meanwhile, FIG. 16 is a view illustrating an example of the list display setting screen 60 in cases where the "DISPLAY ALL" button 52*d* is clicked. Here, assume that twenty advanced function icons in all have been registered in the content managing section 15. In this case, in order to show a list of all the advanced function icons in the region B2, the icon size adjusting section 22*c* reduces the sizes of the advanced function icons.

(Group Changing Process)

Figure 17:
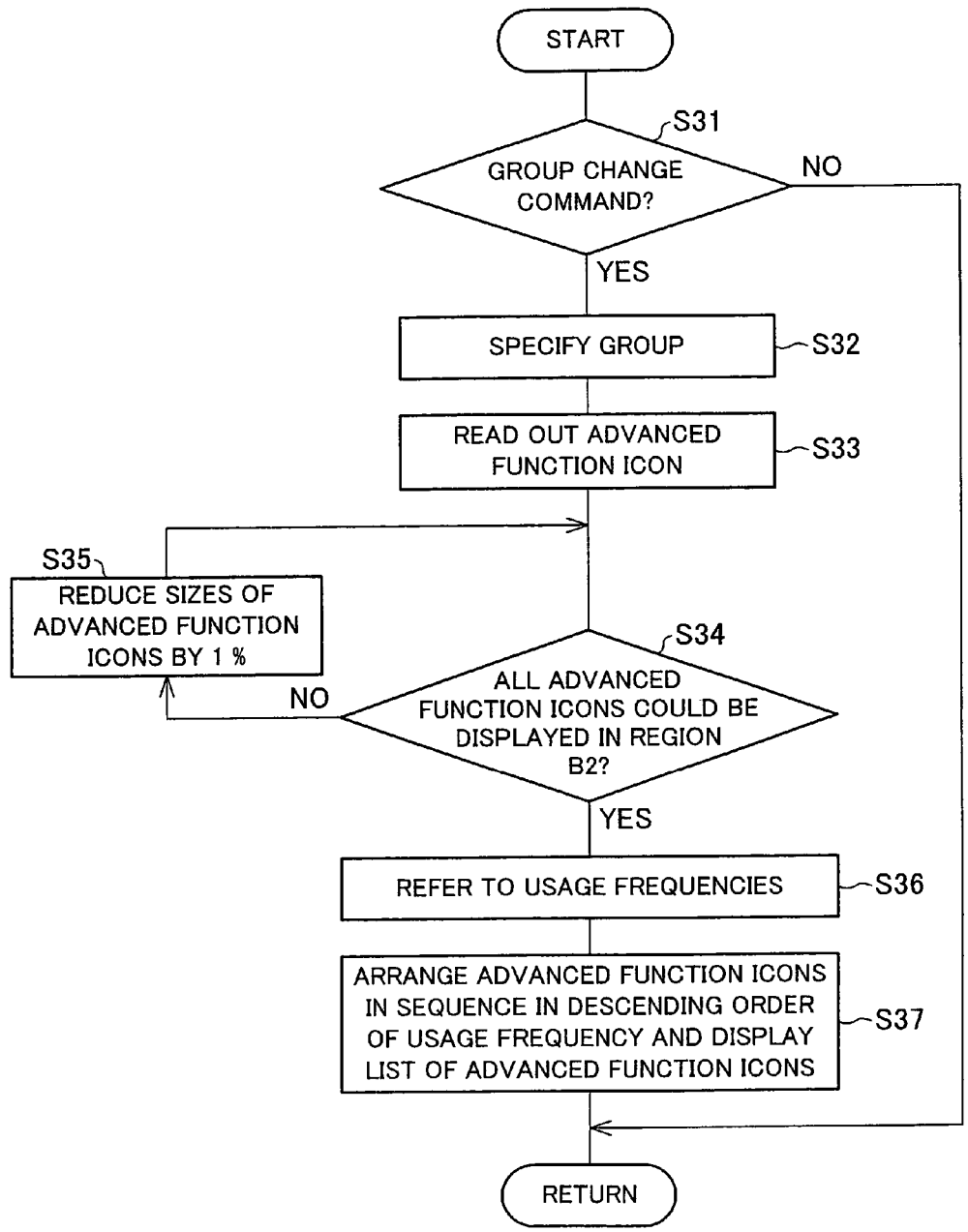
FIG. 17 is a flowchart illustrating a flow of a process for changing a group of advanced function icons to display in list form on a list display setting screen.

Next, referring to a flowchart in FIG. 17, the following will describe a flow of a group changing process indicated in S8.

First of all, the group specifying section 22*a* determines whether any of group change command buttons 62 (In FIGS. 6, 15, and 16, "USEFUL FUNCTION" button 62*a*, "FINISH" button 62*b*, and "IMAGE ADJUSTMENT" button 62*c*, and "DISPLAY ALL" button 62*d*) in the list display setting screen 60 is clicked (S31).

If none of the group change command buttons 62 (62*a* through 62*d*) is clicked (No in S31), the group changing process is terminated, and the procedure returns to S9.

On the other hand, if any of the group change command buttons 62 is clicked (Yes in S31), the group specifying section 22*a* specifies the group of the advanced function icons to be displayed in list form, in accordance with the clicked group change command button 62, and then outputs the group name of the specified group to the advanced function icon acquiring section 22*b* (S32).

More specifically, when the "USEFUL FUNCTION" button 62*a* is clicked, the group specifying section 22*a* outputs the group name "Useful function". When the "FINISHING" button 62*b* is clicked, the group specifying section 22*a* outputs the group name "Finishing". When the "IMAGE ADJUSTMENT" button 62*c* is clicked, the group specifying section 22*a* outputs the group name "Image adjustment". When the "DISPLAY ALL" button 62*d* is clicked, the group specifying section 22*a* outputs the group name "All".

Thereafter, the processes in S33 through S37 are performed. These processes are the same as those in S23 through S27, and explanation thereof is therefore omitted here.

As described above, the host device 1 of the present embodiment is an information processing device which causes the display device 3 to display a setting screen for setting conditions for an operation performed by the printer 2 and the print job generating section 17. The host device 1 includes: the basic screen display processing section (setting screen switching means) 20 which selects and displays either the main setting screen 50 or the list display setting screen (sub-setting screen) 60 as a setting screen in accordance with user's input; the scroll processing section (first display processing means) 21 which causes the main setting screen 50 to sequentially display advanced function icons (first function pictures) respectively representing advanced functions available for the print processing; and the list display processing section (second display processing means) 22*d* which causes the list display setting screen (second setting screen) 60 to display a list of at least part of the advanced function icons.

With this arrangement, a beginning user who does not recognize the advanced functions well can select a setting screen where advanced function icons respectively representing the advanced functions are sequentially displayed, by entering a command for displaying the main setting screen 50 to the input device 4. Thus, the beginning user can confirm the advanced function icons sequentially displayed so as to recognize what kind of functions are present and select a desired function.

Meanwhile, a skilled user who recognizes the functions well can select the list display setting screen where a list of the advanced function icons appears, by entering a command for displaying the list display setting screen 60 to the input device 4. Thus, the skilled user can readily select an advanced function icon corresponding to his/her desired advanced function from the list of the advanced function icons.

Thus, the host device 1 can cause the setting screens enhanced in convenience to show for different users in varying learning levels.

It is to be noted that as to one and the same function, a corresponding advanced function icon shown in the main setting screen has the same image as a corresponding advanced function icon shown in the list display setting screen. For this reason, the user can readily find out an advanced function icon corresponding to a desired function even when the user switches between the main setting screen and the list display setting screen.

Further, the advanced functions are classified into a given number of predetermined groups. The host device 1 includes: the group specifying section (designating means) 22*a* which designates the group in accordance with user's input; and the advanced function icon acquiring section (function picture acquiring means) 22*b* which acquires advanced function icons representing advanced functions which belong to the group designated by the group specifying section 22*a*, from the content managing section 15 where (i) the advanced function icon representing the advanced function and (ii) the group which the advanced function belong to are stored so as to be associated with each other for each of the functions. Then, the list display processing section 22*d* causes a list of the advanced function icons having been acquired by the advanced function icon acquiring section 22*b* to show up.

In the above descriptions, the content managing section 15 is provided inside the host device 1. However, the content managing section 15 may be provided in an external server device for the host device 1. In such an arrangement, the advanced function icon acquiring section 22*b* of the host device 1 reads out advanced function icons from the content managing section 15 via a communications network.

With this arrangement, by designating a group, a user can readily find out advanced function icons representing functions which belong to the designated group from the list display setting screen 60.

Further, the group specifying section 22*a* can specify all the groups in accordance with user's input. With this arrangement, by designating all the groups, the user can find out an advanced function icon representing a function group of which is unknown from the list display setting screen 60.

Further, the host device 1 includes the icon size adjusting section (adjustment means) 22*c* which adjusts the size of the advanced function icon having been acquired by the advanced function icon acquiring section 22*b* so that an area required to arrange all the second function pictures thus acquired by the function picture acquiring means without overlapping each other is smaller than or equal to an area of the region B2 (first region) of the list display setting screen 60. Then, the list display processing section 22c causes the region B2 to display a list of the advanced function icons having been adjusted by the icon size adjusting section 22c.

With this arrangement, the user can visually recognize all the advanced function icons having been acquired by the advanced function icon acquiring section 22b, without scrolling. This makes operation simple.

Still further, the host device 1 includes the usage frequency updating section (calculating means) 18 which calculates usage frequencies of the advanced functions. On the basis of the usage frequencies having been calculated by the usage frequency updating section 18, the scroll processing section 21 causes the main setting screen to sequentially display the advanced function icons in descending order of usage frequency.

With this arrangement, on the main setting screen, the user can select and specify, at an early stage, advanced function icons representing frequently used advanced functions.

Yet further, on the basis of the usage frequencies having been calculated by the usage frequency updating section 18, the list display processing section 22d arranges the advanced function icons in sequence in descending order of usage frequency, and then causes the list display setting screen 60 to display a list of the advanced function icons.

With this arrangement, the user can readily find out advanced function icons representing frequently used advanced functions from among the advanced function icons shown in the top end of the list display setting screen.

MODIFIED EXAMPLES

Modified Example 1 of Advanced Function Icon Displaying Process

The scroll processing section 21 may read out from the content managing section 15 both the advanced function icons and the advanced function names, and cause the region B1 of the main setting screen 50 to sequentially display the advanced function icons together with the advanced function names above or below the advanced function icons while moving the advanced function icons.

Figure 18:
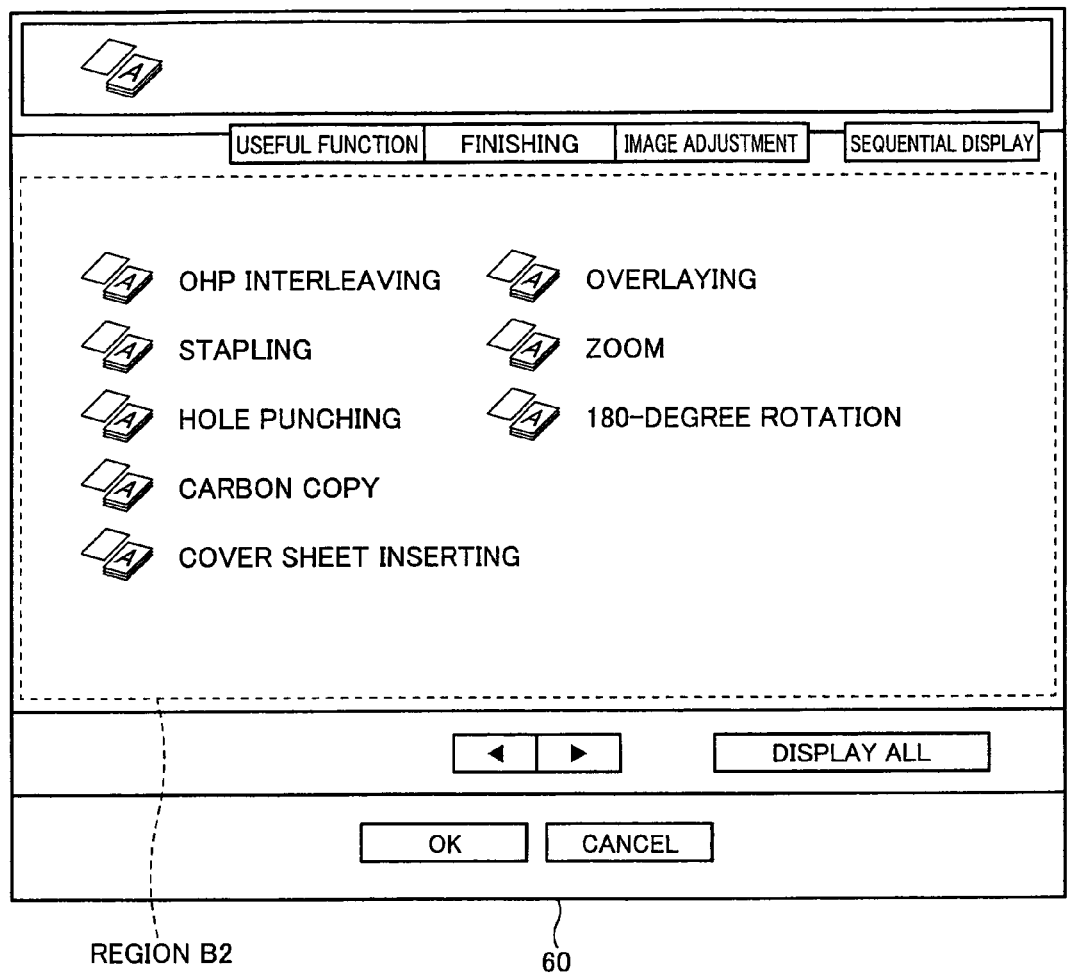
FIG. 18 is a view illustrating another example of display of the advanced function icons in the list display setting screen.

Similarly, the list screen processing section 22 also may cause the advanced function names to display. In this case, the advanced function icon acquiring section 22b reads out from the content managing section 15 both the advanced function icons and the advanced function names. Then, the icon size adjusting section 22c adjusts the sizes of all the advanced function icons and the advanced function names so that all the advanced function icons and the advanced function names can be displayed in the region B2 without overlapping each other. Then, as illustrated in FIG. 18, the list display processing section 22d causes the region B2 of the list display setting screen 60 to display a list of the advanced function icons and the advanced function names having been received from the icon size adjusting section 22c.

Further, the list screen processing section 22 may display only a list of advanced function names.

Thus, instead of the advanced function icons, the advanced function names (character images) may be displayed. Alternatively, both the advanced function icons and the advanced function names may be displayed.

Especially, in case of the list display setting screen, when there are a large number of advanced functions, it may take much time for the user to find out an image representing his/her desired advanced function. In the present modified example, however, the user can readily recognize the advanced functions from the advanced function names shown.

Modified Example 2 of Advanced Function Icon Displaying Process

Figure 19:
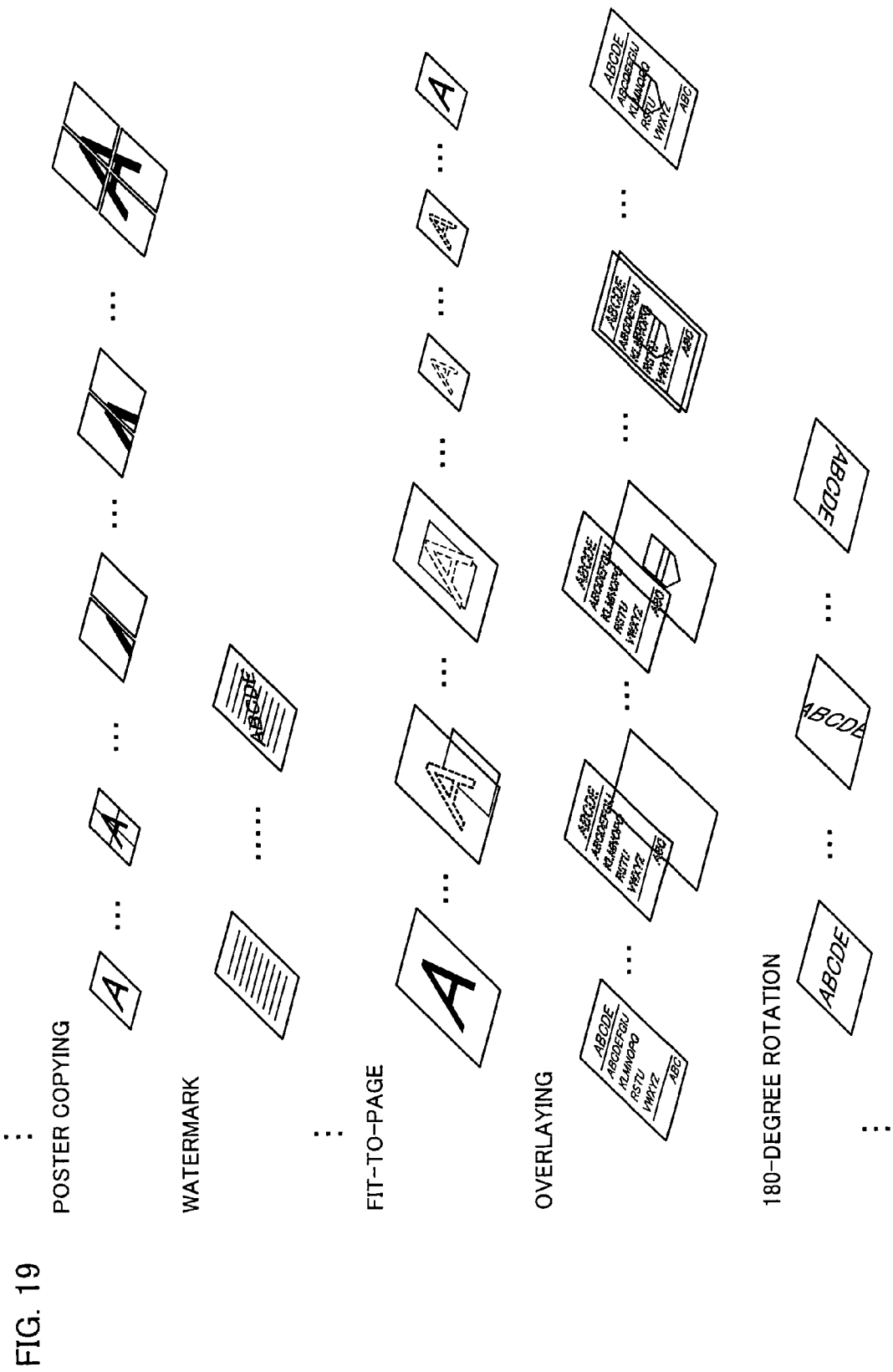
FIG. 19 is a view illustrating frames of each advanced function icon as a moving image.

As illustrated in FIG. 19, each of the advanced function icons may be a moving image made up of a plurality of frames representing the types of the advanced functions.

However, when a list of the advanced function icons all of which are moving images is displayed in the region B2 of the list display setting screen 60, viewability might decrease. For this reason, the list display processing section 22d of the list screen processing section 22 may select frames only one each from the advanced function icons and show a list of the selected frames. With this arrangement, the advanced function icons are moving images in the main setting screen 50, but still images in the list display setting screen 60. As a result, viewability of the advanced function icons in the list display setting screen 60 enhances.

Figure 20:
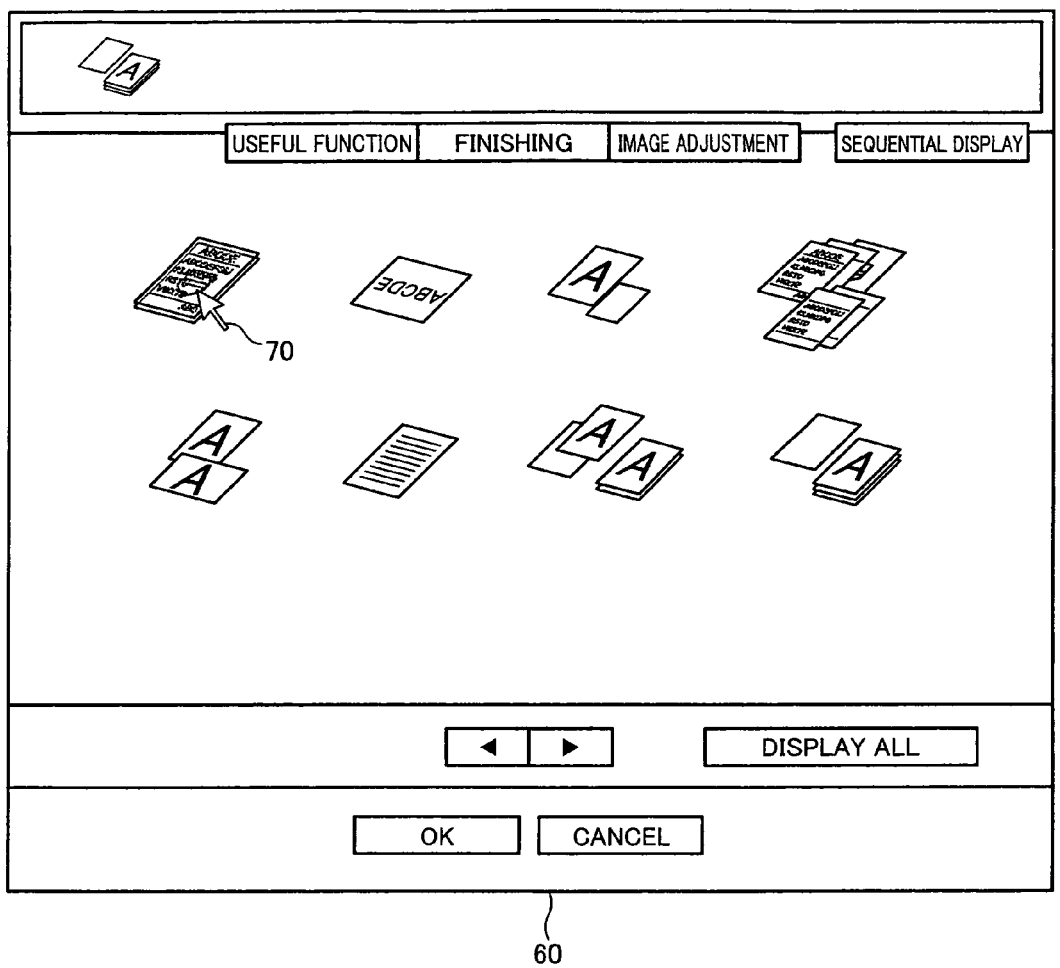
FIG. 20 is a view illustrating an example of a screen in a state where a pointer is placed over one of the advanced function icons displayed on the list display setting screen.

In this case, as illustrated in FIG. 20, when a pointer 70 is placed over one of the advanced function icons in a state where the advanced function icons are still images displayed in list form, the list display processing section 22d may start showing a moving image only for the one of the advanced function icons.

More specifically, the list display processing section 22d causes a second function picture shown at a position designated by the input device (pointing device) 4 to display as a moving image, while displaying other second function pictures as still images.

According to the above arrangement, since the advanced function icon shown at a position designated by the pointing device is a moving image, the user can readily recognize what kind of advanced function icon is designated by the pointer 70. This makes it possible to prevent the user from selecting an unwanted advanced function by mistake.

It is to be noted that the content managing section 15 may store both (i) moving images of the advanced function icons used for the main setting screen 50 and (ii) still images of the advanced function icons used for the list display setting screen 60. The scroll processing section 21 reads out moving images of the advanced function icons, and the advanced function icon acquiring section 22b of the list screen processing section 22 reads out still images of the advanced function icons. Also in this case, the advanced function icons turn moving images on the main setting screen 50, but still images on the list display setting screen 60. This enhances viewability of the advanced function icons on the list display setting screen 60.

Modified Example 3 of Advanced Function Icon Display Process

When there are a large number of advanced functions, sizes of the advanced function icons might decrease in the list display setting screen 60. In this case, it is difficult for the user to recognize what kind of advanced function icon the pointer 70 of the input device 4 is placed over. In view of this, when the pointer 70 is placed over a particular advanced function icon (see FIG. 20), the list display processing section 22d of the list screen processing section 22 may display the particular advanced function icon in a different form from other advanced function icons.

More specifically, the list display processing section 22d displays an advanced function icon shown at a position designated by the input device (pointing device) 4 in a different form from other advanced function icons.

For example, the list display processing section 22d causes the advanced function icon over which the pointer 70 is placed to display with a different size and color from other advanced function icons. Alternatively, the list display processing section 22d causes only the advanced function icon over which the pointer 70 is placed to display with a box having a predetermined shape around such an advanced function icon.

With this arrangement, the user can readily recognize what kind of advanced function icon is designated by the pointer 70. This makes it possible to prevent the user from selecting an unwanted advanced function by mistake.

Modified Example 4 of Advanced Function Icon Displaying Process

In the above descriptions, the list screen processing section 22 causes the region B2 of the list display setting screen 60 to display a list of the advanced function icons which belong to a predetermined group or all the available advanced function icons. However, this is not the only possibility. Alternatively, according to user's input, the list screen processing section 22 may cause the region B2 to display a list of the respective advanced function icons corresponding to advanced functions whose usage frequencies are higher than or equal to a predetermined threshold value.

Figure 24:
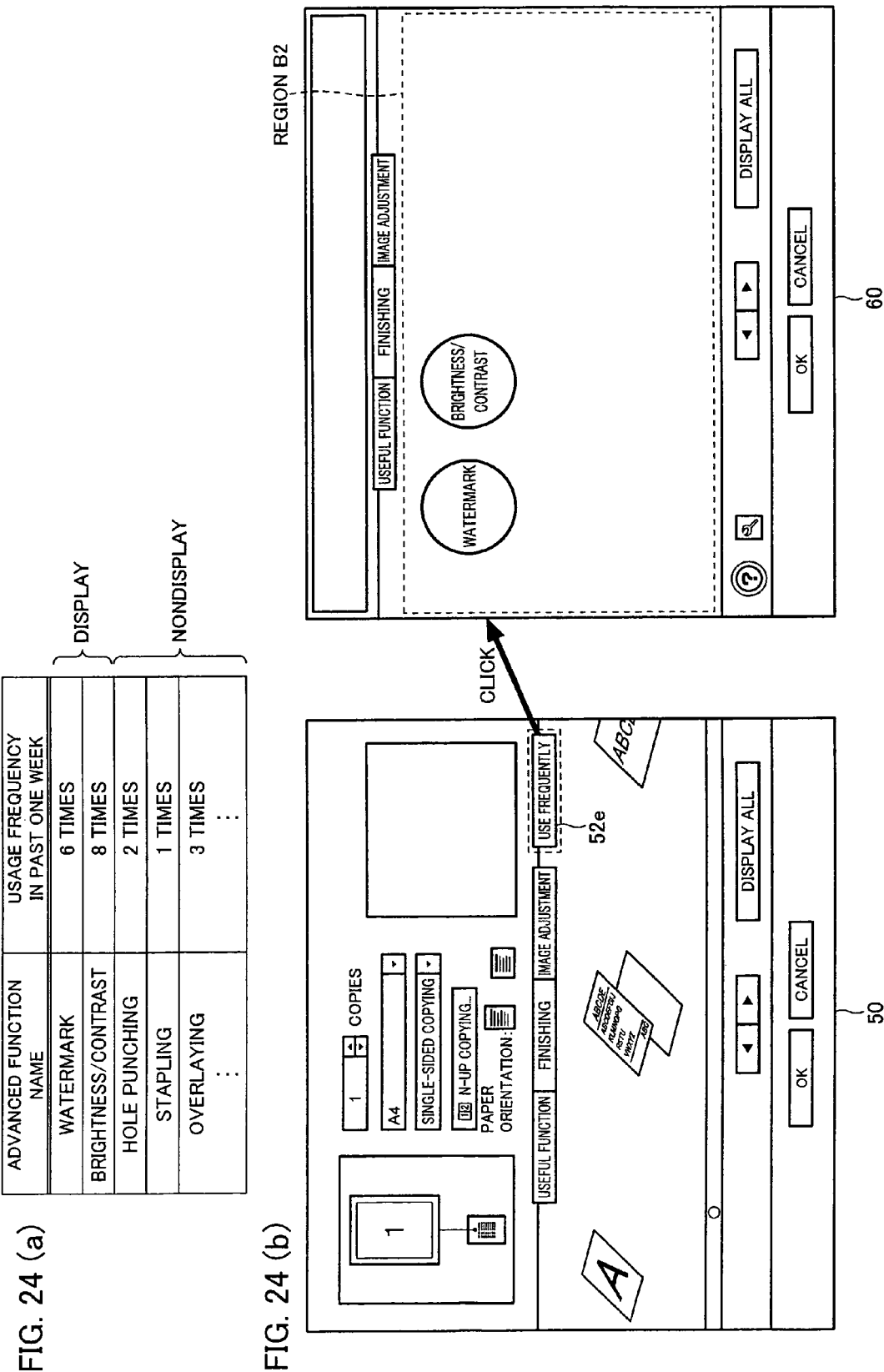
FIG. 24(a) is a view illustrating another example of the usage frequency table managed by the usage frequency managing section.
FIG. 24(b) is a view illustrating a manner of setting screen change that occurs in response to a click of a "USE FREQUENTLY" button in cases where the usage frequency table illustrated in FIG. 24(a) is used.

In this case, as illustrated in a left picture of FIG. 24(*b*), the basic screen display processing section 20 causes the display device 3 to show the main setting screen 50 including a "USE FREQUENTLY" button 52e that is one of the switch buttons 52 for switching to the list display setting screen 60.

When the "USE FREQUENTLY" button 52e is clicked, the basic screen display processing section 20 switches to the list display setting screen 60. Further, the group specifying section 22a extracts an advanced function name of an advanced function whose usage frequency is higher than or equal to a predetermined threshold value from the usage frequency table managed by the usage frequency managing section 19, and then instructs the advanced function icon acquiring section 22b to read out an advanced function icon corresponding to the extracted advanced function name.

For example, assume that the usage frequency managing section 19 manages a usage frequency table illustrated in FIG. 24(*a*). When the "USE FREQUENTLY" button 52e is clicked, the group specifying section 22a extracts advanced function names of advanced functions which have been used five or more times in the past (In this case, "WATERMARK" and "BRIGHTNESS/CONTRAST"). Then, the group specifying section 22a instructs the advanced function icon acquiring section 22b to read out advanced function icons corresponding to the extracted advanced function names. The list display processing section 22d causes the region B2 to display a list of advanced function icons corresponding to the advanced functions "WATERMARK" and "BRIGHTNESS/CONTRAST", which have been acquired by the advanced function icon acquiring section 22b, as illustrated in a right picture of FIG. 24(*b*).

Thus, the advanced function icon acquiring section 22b acquires advanced function icons representing advanced functions whose usage frequencies are greater than or equal to a predetermined threshold value (e.g. five times). Then, the list display processing section 22d shows a list of advanced function icons acquired by the advanced function icon acquiring section 22b.

With this arrangement, the user can confirm a list of advanced function icons representing advanced functions whose usage frequencies are greater than or equal to a predetermined threshold value by switching to the list display setting screen 60. This makes possible for the user to readily select an advanced function the user uses frequently.

Modified Example 5 of Advanced Function Icon Displaying Process

In response to user's input, the list screen processing section 22 may cause the region B2 to display a list of advanced function icons corresponding to the advanced functions whose usage frequencies are greater than or equal to a predetermined threshold value.

Figure 25:
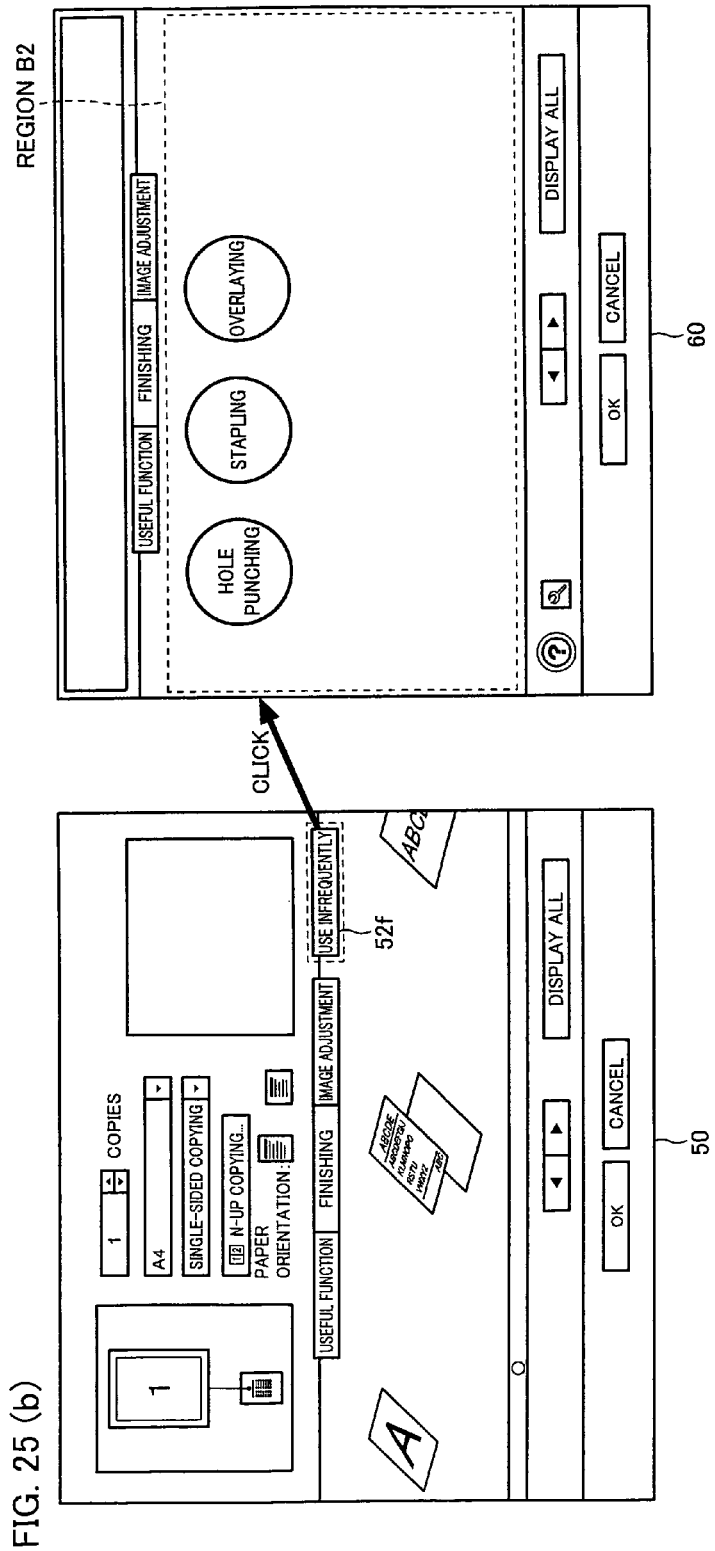
FIG. 25(a) is a view illustrating yet another example of the usage frequency table managed by the usage frequency managing section.
FIG. 25(b) is a view illustrating a manner of setting screen change that occurs in response to a click of a "USE INFREQUENTLY" button in cases where the usage frequency table illustrated in FIG. 25(a) is used.

In this case, as illustrated in a left picture of FIG. 25(*b*), the basic screen display processing section 20 causes the display device 3 to show main setting screen 50 including a "USE INFREQUENTLY" button 52f that is one of the switch buttons 52 for switching to the list display setting screen 60.

When the "USE INFREQUENTLY" button 52f is clicked, the basic screen display processing section 20 switches to the list display setting screen 60. Further, the group specifying section 22a extracts an advanced function name of an advanced function whose usage frequency is less than or equal to a predetermined threshold value from the usage frequency table managed by the usage frequency managing section 19, and then instructs the advanced function icon acquiring section 22b to read out an advanced function icon corresponding to the extracted advanced function name.

For example, assume that the usage frequency managing section 19 manages a usage frequency table illustrated in FIG. 25(*a*). When the "USE INFREQUENTLY" button 52f is clicked, the group specifying section 22a extracts advanced function names of advanced functions which have been never used in the past (In this case, "HOLE PUNCHING", "STAPLING", and "OVERLAYING"). Then, the group specifying section 22a instructs the advanced function icon acquiring section 22b to read out advanced function icons corresponding to the extracted advanced function names. The list display processing section 22d causes the region B2 to display a list of advanced function icons corresponding to the advanced functions "HOLE PUNCHING", "STAPLING", and "OVERLAYING", which have been acquired by the advanced function icon acquiring section 22b, as illustrated in a right picture of FIG. 25(*b*).

Thus, the advanced function icon acquiring section 22b acquires advanced function icons representing advanced functions whose usage frequencies are less than or equal to a predetermined threshold value (e.g. zero times). Then, the list display processing section 22d shows a list of advanced function icons acquired by the advanced function icon acquiring section 22b.

With this arrangement, the user can confirm a list of advanced function icons representing advanced functions whose usage frequencies are less than or equal to a predetermined threshold value by switching to the list display setting screen. This makes possible for the user to readily recognize what kind of advanced functions have been used infrequently in the past. This allows the user to be aware of the existence of useful functions which have not been used.

Modified Example 6 of Advanced Function Icon Displaying Process

In the above descriptions, the scroll processing section 21 sequentially shows the advanced function icons in descending order of usage frequency, and the list display processing section 22d shows the advanced function icons arranged in sequence in descending order of usage frequency. However, an order in which the scroll processing section 21 shows the advanced function icons and an order in which the list display processing section 22d arranges the advanced function icons in sequence are not limited to this. For example, the advanced function icons may be displayed in a predetermined order or in a random order.

Meanwhile, in cases where the advanced function icon acquiring section 22b reads out all the advanced function icons from the content managing section 15 and the list display processing section 22d arranges all the read advanced function icons in sequence, it is preferable that the list display processing section 22d arranges the advanced function icons in sequence in the same order as the advanced function icons displayed by the scroll processing section 21.

More specifically, the list display processing section 22d arranges the advanced function icons in sequence in the same order as the advanced function icons sequentially displayed by the scroll processing section 21, and then causes the list display setting screen 60 to display a list of the advanced function icons.

With this arrangement, an order in which the advanced function icons are displayed in the main setting screen 50 and an order in which the advanced function icons are arranged in sequence in the list display setting screen 60 are identical orders. This allows the user to readily find out advanced function icons corresponding to other advanced functions in both of the setting screens, by using an advanced function icon corresponding to a particular advanced function as a landmark.

For example, assume that a function A is followed by a function B. On the main setting screen 50, the user can specify the function B by selecting an advanced function icon that follows an advanced function icon representing the function A. Similarly, on the second setting screen, the user can specify the function B by selecting the advanced function icon shown next to the advanced function icon representing the function A.

Modified Example 7 of Advanced Function Icon Displaying Process

In causing the region B2 of the list display setting screen 60 to display a list of the advanced function icons in response to a click on any of the switch buttons 52 (52a through 52f) for switching to the list display setting screen 60 in a state where the main setting screen 50 appears, the list display processing section 22d may place at the top of the region B2 the same advanced function icon as an advanced function icon displayed in the region B1 of the main setting screen 50 at the time when any of the switch buttons 52 (52a through 52f) is clicked. With this arrangement, on the list display setting screen 60, the user can confirm the advanced function icons, starting from the advanced function icon displayed in the region B1 of the main setting screen 50 at the time when any of the switch buttons 52 (52a through 52f) has been clicked.

In this case, the list display processing section 22d may cause the region B2 of the list display setting screen 60 to display a list of only the advanced function icons corresponding to advanced functions whose usage frequencies are smaller than or equal to those of the advanced functions of which advanced function icons were displayed in the region B1 of the main setting screen 50 at the time when any of the switch buttons 52 (52a through 52f) was clicked. With this arrangement, the user can confirm on the main setting screen 50 advanced function icons whose usage frequencies are higher than those of the advanced function icons displayed in the region B1 of the main setting screen 50 when the user has clicked any of the switch buttons 52 (52a through 52f). The user can confirm on the list display setting screen 60 only the rest of the advanced function icons.

Modified Example of Advanced Function Icon and Setting Completion Icon Displaying Process The list display processing section 22d of the list screen processing section 22 may read out from the print conditions storage section 16 an advanced function name (i.e. advanced function name of an advanced function settings of which have been completed by the advanced function setting section 25), and then cause the advanced function icon corresponding to the read advanced function name to display in a different form from the other advanced function icons. In other words, the list display processing section 22d may change a display form of the advanced function icons representing advanced functions settings of which have been completed.

For example, the list display processing section 22d causes the advanced function icon corresponding to the advanced function name having been read out from the print conditions storage section 16 to display with a different size and color from other advanced function icons. Alternatively, the list display processing section 22d causes only the advanced function icon corresponding to the advanced function name having been read out from the print conditions storage section 16 to display with a box having a predetermined shape around such an advanced function icon.

With this arrangement, when the list display setting screen 60 appears, it is possible to avoid the user from making a mistake of selecting again an advanced function icon settings of which have been already completed from among the advanced function icons displayed in the region B2.

Similarly, the scroll processing section 21 may read out from the print conditions storage section 16 an advanced function name (i.e. advanced function name of an advanced function settings of which have been completed by the advanced function setting section 25), and then cause the advanced function icon corresponding to the read advanced function name to display in a different form from the other advanced function icons. With this arrangement, when the main setting screen 50 appears, it is possible to avoid the user from making a mistake of selecting again an advanced function icon settings of which have been already completed from among the advanced function icons displayed in the region B1.

It is to be noted that the scroll processing section 21 and the list display processing section 22d preferably cause the advanced function icons corresponding to the advanced function names having been read out from the print conditions storage section 16 to display in the same form. With this arrangement, even when switching between the main setting screen 50 and the list display setting screen 60 is carried out, an advanced function icon settings of which having been completed is displayed in the same form in both the main setting screen 50 and the list display setting screen 60. This allows the user (i) to recognize the correspondence between the main setting screen 50 and the list display setting screen 60 regarding an advanced function icon settings of which has been completed, and (ii) to avoid the user from making a mistake of selecting again an advanced function icon settings of which have been already completed.

Further, the setting completion icon display processing section 23 may cause the region C1 of the main setting screen 50 and the region C2 of the list display setting screen 60 to display the setting completion icon in the form changed by the list display processing section 22d or the scroll processing section 21.

With this arrangement, the advanced function icon and the setting completion icon both of which represent one and the same advanced function are displayed in the same form. This allows the user to recognize (i) the correspondence between the advanced function icon and the setting completion icon and (ii) the fact that the settings of the corresponding advanced function has been completed.

Figure 22:
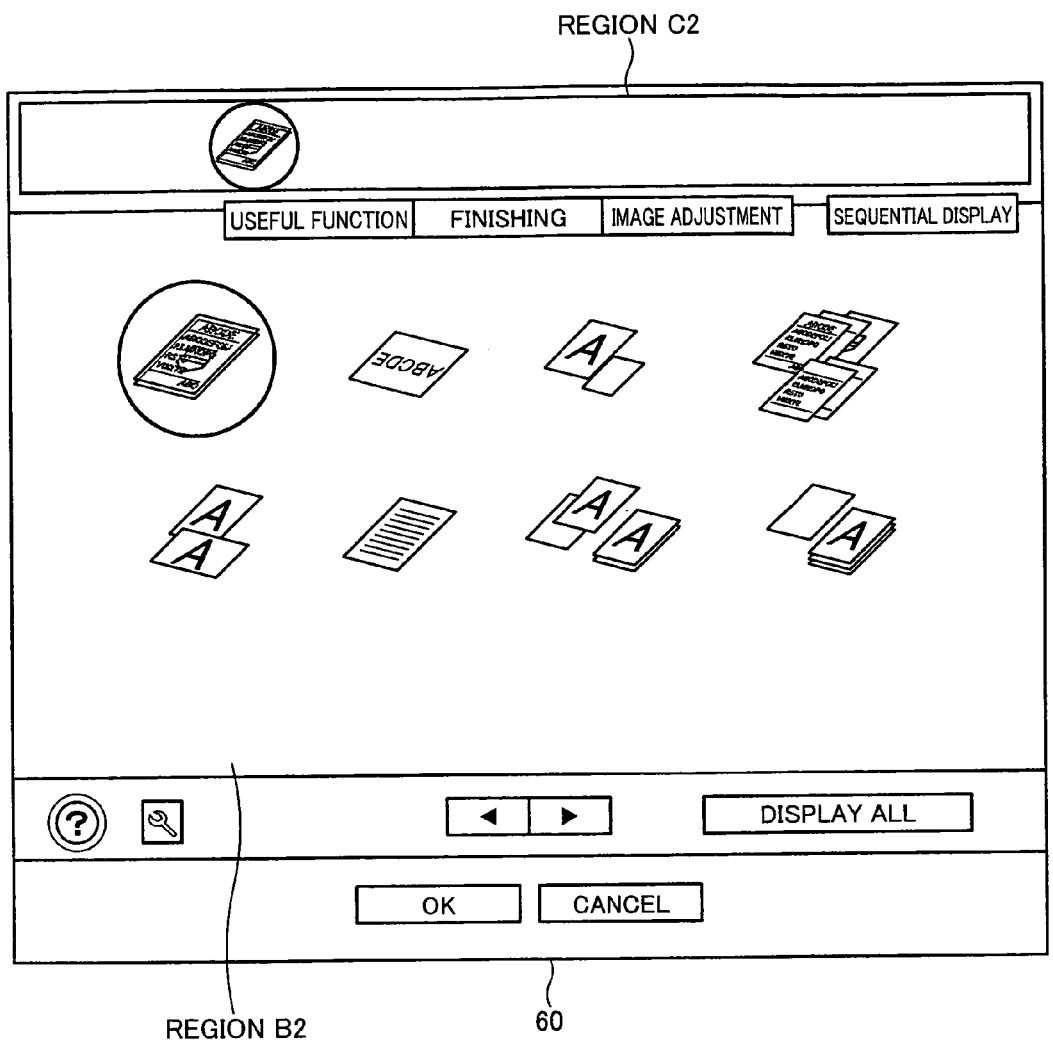
FIG. 22 is a view illustrating a modified example of the list display setting screen.
Figure 23:
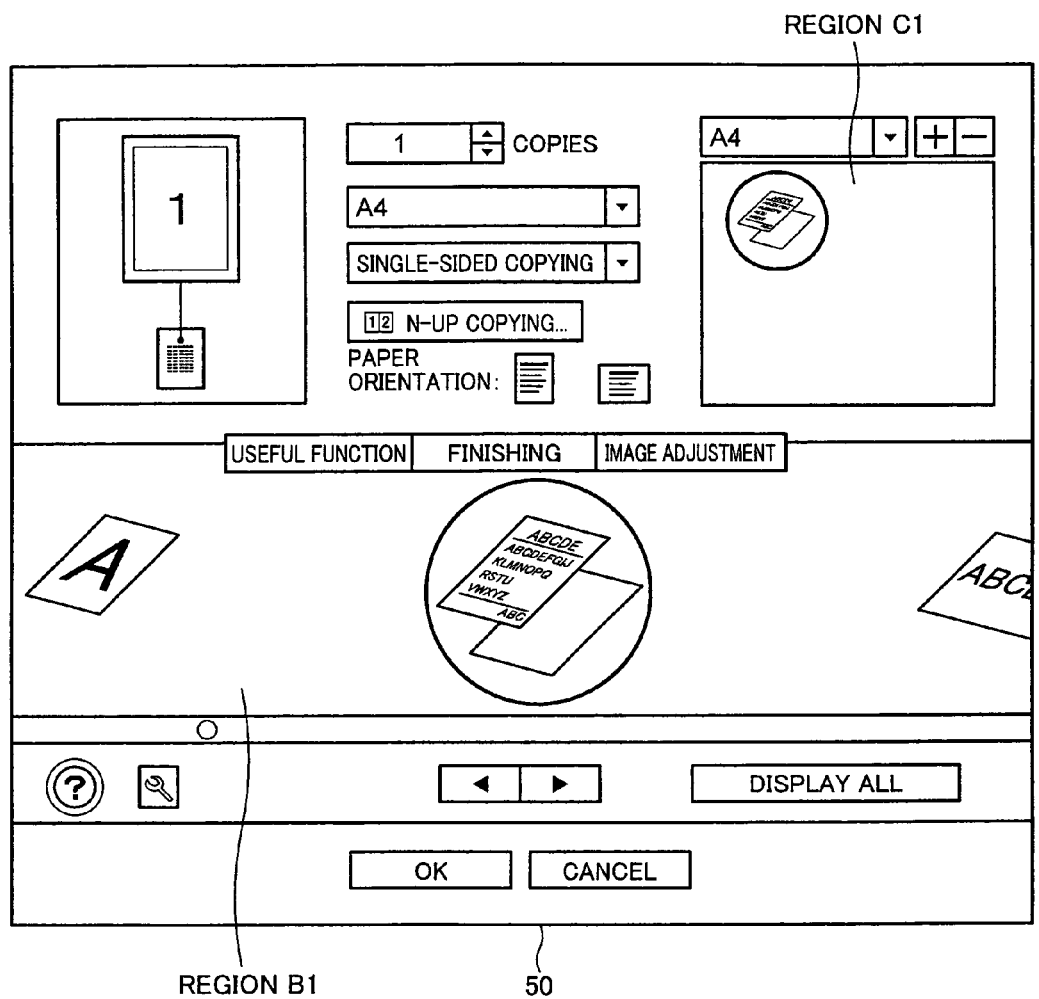
FIG. 23 is a view illustrating a modified example of the main setting screen.

FIG. 22 illustrates an example of the list display setting screen 60 in a case where the setting completion icon display processing section 23 causes the region C2 to display a setting completion icon in the same form as an advanced function icon settings of which have been completed. FIG. 23 is an example of the main setting screen 50 in a case where the setting completion icon display processing section 23 causes the region C1 to display a setting completion icon in the same form as an advanced function icon settings of which has been completed. Thus, the setting completion icon is displayed in the same form in both the main setting screen 50 and the list display setting screen 60. This allows the user to (i) to recognize the correspondence between the main setting screen 50 and the list display setting screen 60 regarding the setting completion icon and (ii) to avoid the user from making a mistake of selecting again an advanced function icon settings of which have been already completed, even when a setting screen is switched to another.

Further, in storing advanced function names and specific conditions for the advanced functions settings of which have been completed into the print conditions storage section 16, the advanced function setting section 25 may add setting numbers so that the advanced function names are mutually recognizable. In this case, as illustrated in FIG. 21, regarding the advanced functions settings of which have been completed, the print conditions storage section 16 stores mutually recognizable setting numbers, advanced function names, and specific conditions therein so that all of which are associated with one another.

Then, the setting completion icon display processing section 23 and the list display processing section 22d may read out from the print conditions storage section 16 both an advanced function name and a setting number, and then display in the same form a setting completion icon and an advanced function icon both corresponding to an advanced function name of one and the same setting number. Similarly, the setting completion icon display processing section 23 and the scroll processing section 21 reads out from the print conditions storage section 16 both an advanced function name and a setting number, and then display in the same form a setting completion icon and an advanced function icon both corresponding to an advanced function name of one and the same setting number.

For example, each the setting completion icon display processing section 23 and the list display processing section 22d adds a square box to each of a setting completion icon and an advanced function icon both corresponding to an advanced function name of a certain setting number, while adding a circle to each of a setting completion icon and an advanced function icon both corresponding to an advanced function name of other setting number. This allows the user (i) to readily recognize the correspondence between the advanced function icon and the setting completion icon and (ii) to recognize that settings of the corresponding advanced function have been completed.

Thus, the present modified example as with the modified examples described above, includes: the advanced function setting section (function setting means) 25 which sets specific conditions for the advanced function corresponding to an advanced function icon which has been selected for settings, in accordance with user's input; and the setting completion icon display processing section (setting completion picture display means) 23 which causes the region C2 (second region) of the list display setting screen 60, which is different from the region B2 (first region) and caused to display the advanced function icons are displayed, to display one or more setting completion icons (setting completion pictures) each representing that settings of specific conditions for the corresponding advanced function have been completed by the advanced function setting section 25. In the present modified example, the list display processing section 22d and the setting completion icon display processing section 23 cause the advanced function icon and the setting completion icon both corresponding to one and the same function to display in the same form.

With this arrangement, by viewing the region C2, the user can readily confirm the advanced functions settings of which have been completed. Further, the user can readily recognize advanced function icons corresponding to the advanced functions settings of which have been completed, among a list of the advanced function icons displayed in the region B2. This avoids the user from specifying again by mistake the advanced function settings of which have been completed.

Further, on the main setting screen, the setting completion icon display processing section 23 causes the region C1 (fourth region), which is different from the region B1 (third region) where the advanced function icons are displayed sequentially, to display the setting completion icons, so that setting completion icons corresponding to one and the same advanced function are displayed on both the main setting screen and the list display setting screen.

With this arrangement, even when the main setting screen is switched to the list display setting screen and vice versa, the user can visually identify a setting completion icon displayed in the same form for a certain advanced function settings of which have been completed. In addition, the user can recognize that the setting completion icon corresponds to the certain advanced function.

Modified Example of a Setting Completion Icon Display Process

In the above descriptions, the setting completion icon display processing section 23 causes the region C1 of the main setting screen 50 or the region C2 of the list display setting screen 60 to display all the setting completion icons corresponding to the advanced function names stored in the print conditions storage section 16. However, the present invention is not limited this. In a situation where the basic screen display processing section 20 shows the list display setting screen 60, the setting completion icon display processing section 23 may extracts setting completion icons corresponding to a group name specified by the group specifying section 22a from among setting completion icons corresponding to advanced function names stored in the print conditions storage section 16, and then cause the region C2 of the list display setting screen 60 to display only the extracted setting completion icons.

With this arrangement, only the setting completion icons corresponding to the advanced functions which belong to the group specified by the user are displayed. As a result, the number of setting completion icons displayed in the region C2 decreases. With this, the setting completion icons are easily visible to the user.

Finally, each block of the printer driver section 12 may be realized by hardware logic or may be realized by software by using a CPU as indicated below.

Namely, the printer driver section 12 includes: a CPU (central processing unit) for carrying out a command of a control program for realizing functions; a ROM (read only memory) that stores the program; a RAM (random access memory) that develops the program; a storage device (storage medium) such as a program memory for storing the program and various data items; and the like. The object of the present invention also can be realized in such a manner that the printer driver section 12 is provided with a computer-readable storage medium for storing program code (such as executable program, intermediate code program, and source program) of a control program of the printer driver section 12 which program serves as software for realizing the functions, and the computer (alternatively, CPU or MPU) reads out and executes the program code stored in the storage medium.

The storage medium is, for example, tapes such as a magnetic tape and a cassette tape, or discs such as magnetic discs (e.g. a floppy disc® and a hard disk), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the printer driver section 12 may be arranged so as to be connectable to a communications network so that the program code is supplied to the printer driver section 12 through the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

As described above, an information processing device of the present invention is an information processing device which causes a display device to display a setting screen for setting conditions for an operation performed in a target device, the information processing device comprising: setting screen switching means for selecting either a first setting screen or a second setting screen as the setting screen in accordance with user's input and then causing the selected setting screen to show; first display processing means for causing the first setting screen to sequentially display first function pictures respectively representing a plurality of available functions in the target device performing the operation; and second display processing means for causing the second setting screen to display a list of at least part of second function pictures respectively representing the plurality of functions.

According to the above arrangement, the setting screen switching means selects, in accordance with user's input, either (i) the first setting screen where the first function pictures respectively representing a plurality of available functions are sequentially displayed or (ii) the second setting screen where a list of the second function pictures respectively representing the functions are displayed, and then causes the display device to display the selected setting screen.

With this arrangement, a beginning user who does not recognize the advanced functions well can select the first setting screen where the first function pictures respectively representing the functions are sequentially displayed, by entering a command for displaying the first setting screen. Thus, the beginning user can confirm the first function pictures sequentially displayed so as to recognize what kind of functions are present and select a desired function.

Meanwhile, a skilled user who recognizes the functions well can select the second setting screen where a list of the second function pictures appears, by entering a command for displaying the second setting screen. Thus, the skilled user can readily select a second function picture corresponding to his/her desired function from the list of the second function pictures.

Thus, it is possible to cause the setting screens enhanced in convenience to show for different users in varying learning levels.

Further, in addition to the above arrangement, the information processing device of the present invention is such that the plurality of functions are classified into a given number of predetermined groups, said information processing device further comprises: designating means for designating any of the groups in accordance with user's input; and function picture acquiring means for acquiring the second function pictures respectively representing the functions which belong to a group designated by the designating means, from a storage device where for each function (i) the second function picture representing the function and (ii) the group that the function belongs to are stored so as to be associated with each other, and the second display processing means causes display of a list of the second function pictures thus acquired by the function picture acquiring means.

According to the above arrangement, the designating means designates any of the groups in accordance with user's input, and the second display processing means causes the second setting screen to display a list of only the second function pictures representing the functions that belong to the designated group. Thus, by designating a group, the user can readily find out the second function pictures respectively representing the functions that belong to the designated group from the second setting screen.

Still further, in addition to the above arrangement, the information processing device of the present invention is preferably such that the designating means is capable of designating all the groups in accordance with user's input.

According to the above arrangement, by designating all the groups, the user can find out a second function picture representing a function group of which is unknown from the second setting screen.

Yet further, in addition to the above arrangement, the information processing device of the present invention is such that the second function picture includes a character image representing a name of the function.

In case where a large number of second function pictures are displayed in list form, it may take much time for the user to find out a second function picture representing his/her desired function. According to the above arrangement, however, the user can readily recognize which second function picture represents which function when seeing the character image shown. As a result, the user can readily find out a second function picture corresponding to his/her desired function from a list of the second function pictures shown.

Further, in addition to the above arrangement, the information processing device of the present invention further includes: adjustment means for adjusting sizes of the second function pictures thus acquired by the function picture acquiring means so that an area required to arrange all the second function pictures thus acquired by the function picture acquiring means without overlapping each other is smaller than or equal to an area of a first region in the second setting screen, the first region being a predetermined region where the second function pictures are displayed, the second display processing means causing the first region to display a list of the second function pictures thus adjusted by the adjustment means.

According to the above arrangement, the adjustment means adjusts sizes of the second function pictures so that all the second function pictures having been acquired by the function picture acquiring means can be arranged in the first region of the second setting screen without overlapping each other. Thus, the second display processing means can arrange all the second function pictures having been acquired by the function picture acquiring means without being overlapped each other and then cause the first region of the second setting screen to display a list of the second function pictures. As a result, the user can visually recognize all the second function pictures having been acquired by the function picture acquiring means, without scrolling. This makes operation simple.

Still further, in addition to the above arrangement, the information processing device of the present invention is such that the second display processing means causes the second function picture shown at a position designated by a pointing device to display in a different form from other second function pictures.

Here, the pointing device is an input device which designates a position on a display screen of the display device. Examples of the pointing device includes a mouse, a trackball, a trackpad, and a tablet.

Further, the display form includes color and size of the function picture and type of a picture (e.g. box and mark) added to the function picture.

In case where a large number of second function pictures are displayed in list form, the user may select by mistake a second function picture representing a his/her unwanted function by placing the pointing device over it.

However, according to the above arrangement, since the second function picture shown at a position designated by the pointing device is displayed in different form from other second function pictures, the user can readily recognize which second function picture is designated by the pointing device. As a result, it is possible to prevent the user from selecting the second function picture that represents his/her unwanted function by mistake.

Yet further, in addition to the above arrangement, the information processing device of the present invention is such that the second display processing means causes a second function picture shown at a position designated by a pointing device to display as a moving image, while displaying other second function pictures as still images.

According to the above arrangement, since the second function picture shown at a position designated by the pointing device is a moving image, the user can readily recognize which second function picture is designated by the pointing device. As a result, it is possible to prevent the user from selecting the second function picture that represents his/her unwanted function by mistake.

By making a moving image of the second function picture shown at a position designated by the pointing device as an image representing the type of the function corresponding to the second function picture, the user can recognize the type of the function designated by the pointing device.

Further, in addition to the above arrangement, the information processing device of the present invention further includes: function setting means for setting specific conditions for the function corresponding to the first function picture or the second function picture which has been selected for settings, in accordance with user's input; and setting completion picture display processing means for causing a second region of the second setting screen to display one or more setting completion pictures each representing that settings of specific conditions for the corresponding function have been completed by the function setting means, the second region being different from the first region where the second function pictures are displayed by the second display processing means, the second display processing means and the setting completion picture display processing means causing the second function picture and the setting completion picture both corresponding to one and the same function to display in the same form.

According to the above arrangement, by checking the second region of the second setting screen, the user can readily confirm the functions the settings of which have been completed. Further, the user can readily recognize the second function pictures corresponding to the functions the settings of which have been completed among a list of the second function pictures displayed in the first region. This avoids the user from making a mistake of selecting again the function settings of which have been already completed.

Still further, in addition to the above arrangement, the information processing device of the present invention is such that the setting completion picture display processing means causes a fourth region of the first setting screen, which is different from a third region of the first setting screen where the first function pictures are displayed by the first display processing means, to display the setting completion picture, so that the setting completion pictures corresponding to one and the same function are displayed in the same form on both the first setting screen and the second setting screen.

According to the above arrangement, for the function the settings of which have been completed, the setting completion picture representing that settings of the function have been completed is displayed on both the first setting screen and the second setting screen. Then, on the first setting screen and the second setting screen, the setting completion pictures corresponding to one and the same function are displayed in the same form. Thus, even when the first setting screen is switched to the second setting screen and vice versa, the user can visually identify a setting completion picture displayed in the same form for a certain function settings of which have been completed. In addition, the user can recognize that the setting completion picture corresponds to the certain advanced function.

Yet further, in addition to the above arrangement, the information processing device of the present invention further includes: function setting means for setting specific conditions for the function corresponding to the first function picture or the second function picture which has been selected for settings, in accordance with user's input; and setting completion picture display processing means for causing a second region of the second setting screen to display setting completion pictures representing that settings of specific conditions for the corresponding functions which belong to the group designated by the designating means have been completed by the function setting means, the second region being different from the first region where the second function pictures are displayed by the second display processing means.

According to the above arrangement, by checking the second region of the second setting screen, the user can readily confirm the functions settings of which have been completed. Further, the second region show only the setting completion images corresponding to the functions that belong to the group designated by the user. With such an arrangement, the number of setting completion pictures decreases as compared with an arrangement in which the setting completion images corresponding to all the functions settings of which have been completed are displayed. This allows the user to easily confirm the setting completion pictures displayed in the second region.

Further, in addition to the above arrangement, the information processing device of the present invention is such that the first function picture is a moving image and the second function picture is a still image.

According to the above arrangement, in case of the first setting screen, the first function pictures are displayed sequentially. Thus, the number of the first function pictures displayed on the first setting screen at the same time is small. As a result, by displaying the first function pictures as moving images, it is possible to specifically recognize the types of the functions corresponding to the first function pictures.

In case of the second setting screen, a list of the second function pictures is displayed, which may cause a simultaneous display of multiple second function pictures in the second setting screen. In this case, if the second function pictures are moving images, the second setting screen becomes crowded with the second function pictures, which decreases user's viewability. However, such a problem does not rise in the above arrangement since the second function pictures are still images.

The user can select a setting screen according to his/her preference.

Still further, in addition to the above arrangement, the information processing device of the present invention is such that the first function picture and the second function picture both representing one and the same function are identical pictures.

According to the above arrangement, even when the first setting screen is switched to the second setting screen and vice versa, the user can readily find out a function picture corresponding to one and the same function.

Yet further, in addition to the above arrangement, the information processing device of the present invention further includes: calculating means for calculating usage frequencies of the functions, the first display processing means causing the first setting screen to sequentially display the corresponding first function pictures in descending order of usage frequency, in accordance with the usage frequencies thus calculated by the calculating means.

According to the above arrangement, the first function pictures are displayed in descending order of usage frequency. With this arrangement, on the first setting screen, the user can select and specify, at an early stage, first function pictures representing frequently used functions.

Further, in addition to the above arrangement, the information processing device of the present invention further includes: calculating means for calculating usage frequencies of the functions, the second display processing means for arranging in sequence the corresponding second function pictures in descending order of usage frequency, in accordance with the usage frequencies thus calculated by the calculating means, and then causing the second setting screen to display a list of the second function pictures.

According to the above arrangement, the second function pictures arranged in sequence in descending order of usage frequency is displayed in list form. With this arrangement, the user can readily find out second function pictures representing frequently used functions from among the second function pictures shown in the top end of the second setting screen.

Still further, the information processing device of the present invention further include: calculating means for calculating usage frequencies of the functions; and function picture acquiring means for extracting the functions whose usage frequencies calculated by the calculating means are not lower than or not higher than a predetermined threshold value from among the plurality of functions, and then acquiring the second function pictures representing the thus extracted functions, the second display processing means for causing display of a list of the function pictures acquired by the function picture acquiring means.

According to the above arrangement, by switching to the second setting screen, the user can check a list of the second function pictures representing the functions whose usage frequencies are not lower than or not higher than a predetermined threshold value.

Assume that a list of the second function pictures representing the functions whose usage frequencies are not lower than a predetermined threshold value are displayed. In such a case, when the user switches to the second setting screen, the user can readily select a frequently used function.

Meanwhile, assume that a list of the second function pictures representing the functions whose usage frequencies are not higher than a predetermined threshold value are displayed. In such a case, when the user switches to the second setting screen, it is possible for the user to readily recognize what kind of functions have been used infrequently in the past. This allows the user to be aware of the existence of useful functions which have not been used.

Yet further, in addition to the above arrangement, the information processing device of the present invention is such that the second display processing means arranges the second function pictures respectively representing the functions in sequence in the same order as the first function pictures respectively representing the functions displayed by the first display processing means, and then causes the second setting screen to display a list of the second function pictures.

According to the above arrangement, an order in which the first function pictures are displayed in the first setting screen and an order in which the second function pictures are arranged in sequence in the second setting screen are identical orders. This allows the user to readily find out function pictures corresponding to other functions in both of the setting screens, by using a function picture corresponding to a particular function as a landmark.

For example, assume that a function A is followed by a function B. On the first setting screen, the user can specify the function B by selecting a first function picture that follows a first function picture representing the function A. On the second setting screen, the user can specify the function B by selecting a second function picture shown next to a second function picture representing the function A.

Further, in addition to the above arrangement, the information processing device of the present invention is such that when the setting screen switching means switches from the first setting screen to the second setting screen, the second display processing means causes the second setting screen to display a list of the second function pictures, while placing at a top of the second setting screen the second function picture corresponding to a function represented by the first function picture having been displayed in the first setting screen at the time of switching from the first setting screen to the second setting screen.

According to the above arrangement, the user can check a list of second function pictures that are arranged in sequence in the same order as the first function pictures displayed on the first setting screen before the first setting screen is switched to the second setting screen.

It is noted that the foregoing information processing device may be realized by a computer. In such a case, the invention also includes (i) a program for realizing the information processing device by a computer by causing the computer to operate as the foregoing means, and (ii) a computer-readable storage medium storing the program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An information processing device which causes a display device to display a setting screen for setting conditions for an operation performed in a target device, the information processing device comprising:

setting screen switching means for selecting either a first setting screen or a second setting screen as the setting screen in accordance with user's input and then causing the selected setting screen to show;

first display processing means for causing the first setting screen to sequentially display first function pictures respectively representing a plurality of available functions in the target device performing the operation;

second display processing means for causing the second setting screen to display a list of at least part of second function pictures respectively representing the plurality of functions;

function setting means for setting specific conditions for the function corresponding to the first function picture or the second function picture which has been selected for settings, in accordance with user's input; and setting completion picture display processing means for causing a second region of the second setting screen to display one or more setting completion pictures each representing that settings of specific conditions for the corresponding function have been completed by the function setting means, the second region being different from a first region where the second function pictures are displayed by the second display processing means.

2. The information processing device according to claim 1, wherein:

the plurality of functions are classified into a given number of predetermined groups, said information processing device further comprises:

designating means for designating any of the groups in accordance with user's input; and function picture acquiring means for acquiring the second function pictures respectively representing the functions which belong to a group designated by the designating means, from a storage device where for each function (i) the second function picture representing the function and (ii) the group that the function belongs to are stored so as to be associated with each other, and the second display processing means causes display of a list of the second function pictures thus acquired by the function picture acquiring means.

3. The information processing device according to claim 2, wherein:

the designating means is capable of designating all the groups in accordance with user's input.

4. The information processing device according to claim 1, wherein:

the second function picture includes a character image representing a name of the function.

5. The information processing device according to claim 2, further comprising:

adjustment means for adjusting sizes of the second function pictures thus acquired by the function picture acquiring means so that an area required to arrange all the second function pictures thus acquired by the function picture acquiring means without overlapping each other is smaller than or equal to an area of a first region in the second setting screen, the first region being a predetermined region where the second function pictures are displayed, the second display processing means causing the first region to display a list of the second function pictures thus adjusted by the adjustment means.

6. The information processing device according to claim 1, wherein:

the second display processing means causes the second function picture shown at a position designated by a pointing device to display in a different form from other second function pictures.

7. The information processing device according to claim 1, wherein:

the second display processing means causes a second function picture shown at a position designated by a pointing device to display as a moving image, while displaying other second function pictures as still images.

8. The information processing device according to claim 1, wherein:

the second display processing means and the getting completion picture display processing means causes the second function picture and the setting completion picture both corresponding to one and the same function to display in the same form.

9. The information processing device according to claim 8, wherein:

the setting completion picture display processing means causes a fourth region of the first setting screen, which is different from a third region of the first setting screen where the first function pictures are displayed by the first display processing means, to display the setting completion picture, so that the setting completion picture displayed on the first setting screen is the same in display form as the setting completion picture displayed on the second setting screen.

10. The information processing device according to claim 2, further comprising:

function setting means for setting specific conditions for the function corresponding to the first function picture or the second function picture which has been selected for settings, in accordance with user's input; and setting completion picture display processing means for causing a second region of the second setting screen to display setting completion pictures representing that settings of specific conditions for the corresponding functions which belong to the group designated by the designating means have been completed by the function setting means, the second region being different from the first region where the second function pictures are displayed by the second display processing means.

11. The information processing device according to claim 1, wherein:

the first function picture is a moving image and the second function picture is a still image.

12. The information processing device according to claim 1, wherein:

the first function picture and the second function picture both representing one and the same function are identical pictures.

13. The information processing device according to claim 1, further comprising:

calculating means for calculating usage frequencies of the functions, the first display processing means causing the first setting screen to sequentially display the corresponding first function pictures in descending order of usage frequency, in accordance with the usage frequencies thus calculated by the calculating means.

14. The information processing device according to claim 1, further comprising:
calculating means for calculating usage frequencies of the functions,
the second display processing means for arranging in sequence the corresponding second function pictures in descending order of usage frequency, in accordance with the usage frequencies thus calculated by the calculating means, and then causing the second setting screen to display a list of the second function pictures.

15. The information processing device according to claim 1, further comprising:
calculating means for calculating usage frequencies of the functions; and
function picture acquiring means for extracting the functions whose usage frequencies calculated by the calculating means are not lower than or not higher than a predetermined threshold value from among the plurality of functions, and then acquiring the second function pictures representing the thus extracted functions,
the second display processing means for causing display of a list of the function pictures acquired by the function picture acquiring means.

16. The information processing device according to claim 1, wherein:
the second display processing means arranges the second function pictures respectively representing the functions in sequence in the same order as the first function pictures respectively representing the functions displayed by the first display processing means, and then causes the second setting screen to display a list of the second function pictures.

17. The information processing device according to claim 16, wherein:
when the setting screen switching means switches from the first setting screen to the second setting screen, the second display processing means causes the second setting screen to display a list of the second function pictures, while placing at a top of the second setting screen the second function picture corresponding to a function represented by the first function picture having been displayed in the first setting screen at the time of switching from the first setting screen to the second setting screen.

18. An information processing device comprising a program for operating the information processing device which causes a display device to display a setting screen for setting conditions for an operation performed in a target device, the program causing a computer to execute: a setting screen switching step of causing either a first setting screen or a second setting screen as the setting screen to appear in accordance with user's input; a first display processing step of causing the first setting screen to sequentially display first function pictures respectively representing a plurality of available functions in the target device performing the operation; a second display processing step of causing the second setting screen to display a list of at least part of second function pictures respectively representing the plurality of functions; a function setting step of causing the setting of specific conditions for the function corresponding to the first function picture or the second function picture which has been selected for settings, in accordance with user's input; and a setting completion picture display processing step of causing a second region of the second setting screen to display one or more setting completion pictures each representing that settings are specific conditions for the corresponding function have been completed by the function setting means, the second region being different from a first region, where the second function pictures are displayed by the second display processing means.

19. A storage medium which doors a program for operating an information processing device which causes a display device to display a setting screen for setting conditions for an operation performed in a target device, the program causing a computer to execute: a setting screen switching step of causing either a first setting screen or a second setting screen as the setting screen to appear in accordance with user's input; a first display processing step of causing the first setting screen to sequentially display first function pictures respectively representing a plurality of available functions in the target device performing the operation; a second display processing step of causing the second setting screen to display a list of at least part of second function pictures respectively representing the plurality of functions; a function setting step of causing the setting of specific conditions for the function corresponding to the first function picture or the second function picture which has been selected for settings, in accordance with user's input; and a setting completion picture display processing step of causing a second region of the second setting screen to display one or more setting completion pictures each representing that settings are specific conditions for the corresponding function have been completed by the function setting means, the second region being different from a first region where the second function pictures are displayed by the second display processing means.

20. An information processing method for causing a display device to display a setting screen for setting conditions for an operation performed in a target device, the information processing method comprising: a setting screen switching step of causing either a first setting screen or a second setting screen as the setting screen to appear in accordance with user's input; a first display processing step of causing the first setting screen to sequentially display first function pictures respectively representing a plurality of available functions in the target device performing the operation; a second display processing step of causing the second setting screen to display a list of at least part of second function pictures respectively representing the plurality of functions; a function setting step of causing the setting of specific conditions for the function corresponding to the first function picture or the second function picture which has been selected for settings, in accordance with user's input; and a setting completion picture display processing step of causing a second region of the second setting screen to display one or more setting completion pictures each representing that settings are specific conditions for the corresponding function have been completed by the function setting means, the second region being different from a first region where the second function pictures are displayed by the second display processing means.

* * * * *